US012784078B2

(12) United States Patent
Saravu

(10) Patent No.: US 12,784,078 B2
(45) Date of Patent: Nov. 3, 2026

(54) DATA AGGREGATION AND USER INTERFACES FOR EFFICIENT SERVICE CUSTOMIZATION AND MONITORING

(71) Applicant: MONETIZE360, INC., Milpitas, CA (US)

(72) Inventor: Mahalingeshwara Saravu, Fremont, CA (US)

(73) Assignee: Monetize360, Inc., Milpitas, CA (US)

( * ) Notice: Subject to any disclaimer, the term of this patent is extended or adjusted under 35 U.S.C. 154(b) by 0 days.

(21) Appl. No.: 18/660,056

(22) Filed: May 9, 2024

(65) Prior Publication Data

US 2024/0412265 A1 Dec. 12, 2024

Related U.S. Application Data

(60) Provisional application No. 63/606,006, filed on Dec. 4, 2023, provisional application No. 63/501,118, filed on May 9, 2023.

(51) Int. Cl.

*G06Q 30/0283* (2023.01)
*G06F 16/3329* (2025.01)
*G06F 16/34* (2025.01)
*G06Q 30/0207* (2023.01)

(52) U.S. Cl.

CPC ..... *G06Q 30/0283* (2013.01); *G06F 16/3329* (2019.01); *G06F 16/345* (2019.01); *G06Q 30/0239* (2013.01)

(58) Field of Classification Search

None

See application file for complete search history.

(56) References Cited

U.S. PATENT DOCUMENTS

2013/0103470 A1* 4/2013 Lendner ............ G06Q 30/0267 705/14.16
2015/0134431 A1* 5/2015 Georgoff ........... G06Q 30/0207 705/14.13

* cited by examiner

*Primary Examiner* — George Chen

(74) *Attorney, Agent, or Firm* — Knobbe, Martens, Olson & Bear, LLP

(57) ABSTRACT

Systems and methods for presentation of an interactive user interface. The systems and methods may include receiving, via the interactive user interface, information defining an electronic service to be offered to receiving entities via deals. The information may include an indication of a plurality of dimensions to be extracted from real-time interaction data. The systems and methods may include determining information defining a customization associated with a particular deal of the deals. The customization may enable adjustments to the information defining the electronic service. A same SKU may be utilized for the customizations associated with the deals. The systems and methods may include integrating the real-time interaction data from a plurality of outside systems. The interactive user interface may receive user input indicative of transformations and logic associated with analyzing the real-time interaction data. The integrated real-time interaction data may be utilized for fee calculations.

20 Claims, 30 Drawing Sheets

620

DATA AGGREGATION AND USER INTERFACES FOR EFFICIENT SERVICE CUSTOMIZATION AND MONITORING

CROSS-REFERENCE TO RELATED APPLICATIONS

This application claims priority to U.S. Prov. Patent App. No. 63/501,118 titled "DATA AGGREGATION AND USER INTERFACES FOR EFFICIENT SERVICE CUSTOMIZATION AND MONITORING" and filed on May 9, 2023 and U.S. Prov. Patent Appl. No. 63/606,006 titled "DATA AGGREGATION AND USER INTERFACES FOR EFFICIENT SERVICE CUSTOMIZATION AND MONITORING" and filed on Dec. 4, 2023, the disclosures of which are hereby incorporated herein by reference in their entirety.

BACKGROUND

Technical Field

The present disclosure relates to techniques for aggregation of data and customization associated with services.

Description of Related Art

Entities are increasingly relying on third-party services, such as web applications, service endpoints, and so on, to perform disparate functions related to their operation. For example, a company may require a number of licenses for software which allows for a deep technical analysis of an internal network. In this example, the software may be operated by users of the company based on the number of licenses. As another example, a company may use a web service where the company's interactions with the web service are monitored. The third-party which operates the web service may monitor the usage of the web service by users of the company.

These third-party services may require complex licensing schemes. At present, these licensing schemes are inflexibly defined with long times required to adjust or customize them.

SUMMARY

The innovations described in the claims each have several aspects, no single one of which is solely responsible for its desirable attributes. Without limiting the scope of the claims, some prominent features of this disclosure will now be briefly described.

In some aspects, the techniques described herein relate to a method implemented by a system of one or more computers, the method including: causing presentation of an interactive user interface; receiving, via the interactive user interface, information defining an electronic service to be offered to receiving entities via deals, wherein the information includes an indication of a plurality of dimensions to be extracted from real-time interaction data; determining information defining a customization associated with a particular deal of the deals, wherein the customization enables adjustments to the information defining the electronic service, and wherein a same SKU is utilized for the customizations associated with the deals; integrating the real-time interaction data from a plurality of outside systems, wherein the interactive user interface receives user input indicative of transformations and logic associated with analyzing the real-time interaction data, and wherein the integrated real-time interaction data is utilized for fee calculations.

In some aspects, the techniques described herein relate to a system including one or more processors and computer storage media storing instructions that when executed by the one or more processors cause the one or more processors to perform operations including: causing presentation of an interactive user interface; receiving, via the interactive user interface, information defining an electronic service to be offered to receiving entities via deals, wherein the information includes an indication of a plurality of dimensions to be extracted from real-time interaction data; determining information defining a customization associated with a particular deal of the deals, wherein the customization enables adjustments to the information defining the electronic service, and wherein a same SKU is utilized for the customizations associated with the deals; integrating the real-time interaction data from a plurality of outside systems, wherein the interactive user interface receives user input indicative of transformations and logic associated with analyzing the real-time interaction data, and wherein the integrated real-time interaction data is utilized for fee calculations.

In some aspects, the techniques described herein relate to a method implemented by a system of one or more computers, wherein the system is configured to cause presentation of a user interface via a user device, and wherein the user interface: responds to user input associated with defining an electronic service, wherein the user input indicates one or more dimensions which are utilized in a fee calculation for the electronic service; presents options associated with creation of deals based on the electronic service, wherein a particular option is associated with customizing the electronic service for a particular receiving entity of a plurality of receiving entities, and wherein the customizing the electronic service includes adjusting at least one of the one or more dimensions or adjusting one or more logical expressions which form the fee calculation; and causing, via the system, ingesting of interaction data associated with the electronic service, wherein the interaction data is associated with the plurality of receiving entities and is received via a plurality of outside systems, and wherein transformations and logic are applied to in real-time to the interaction data to determine fee calculations for the plurality of receiving entities.

In some aspects, the techniques described herein relate to a method implemented by a system of one or more computers, the method including: causing presentation of an interactive user interface; receiving, via the interactive user interface, sample usage data associated with an electronic service offered to receiving entities via deals; determining, using one or more internal machine learning models, generalized profile data from the sample usage data, wherein the generalized profile data includes at least a language prompt associated with the sample usage data; determining, using one or more external machine learning models, specified profile data for the generalized profile data, wherein the specified profile data includes at least a language description of fees for the electronic service; and automatically configuring a plurality of dimensions associated with the electronic service based on the specified profile data.

In some aspects, the techniques described herein relate to a system including one or more processors and non-transitory computer storage media storing instructions that when executed by the one or more processors, cause the processors to perform operations including: causing presentation of an interactive user interface; receiving, via the interactive user interface, sample usage data associated with an electronic service offered to receiving entities via deals; determining, using one or more internal machine learning models, generalized profile data from the sample usage data, wherein the generalized profile data includes at least a language prompt associated with the sample usage data; determining, using one or more external machine learning models, specified profile data for the generalized profile data, wherein the specified profile data includes at least a language description of fees for the electronic service; and automatically configuring a plurality of dimensions associated with the electronic service based on the specified profile data.

In some aspects, the techniques described herein relate to non-transitory computer storage media storing instructions that when executed by a system of one or more processors, cause the one or more processors to perform operations including: causing presentation of an interactive user interface; receiving, via the interactive user interface, sample usage data associated with an electronic service offered to receiving entities via deals; determining, using one or more internal machine learning models, generalized profile data from the sample usage data, wherein the generalized profile data includes at least a language prompt associated with the sample usage data; determining, using one or more external machine learning models, specified profile data for the generalized profile data, wherein the specified profile data includes at least a language description of fees for the electronic service; and automatically configuring a plurality of dimensions associated with the electronic service based on the specified profile data.

Figure 1:
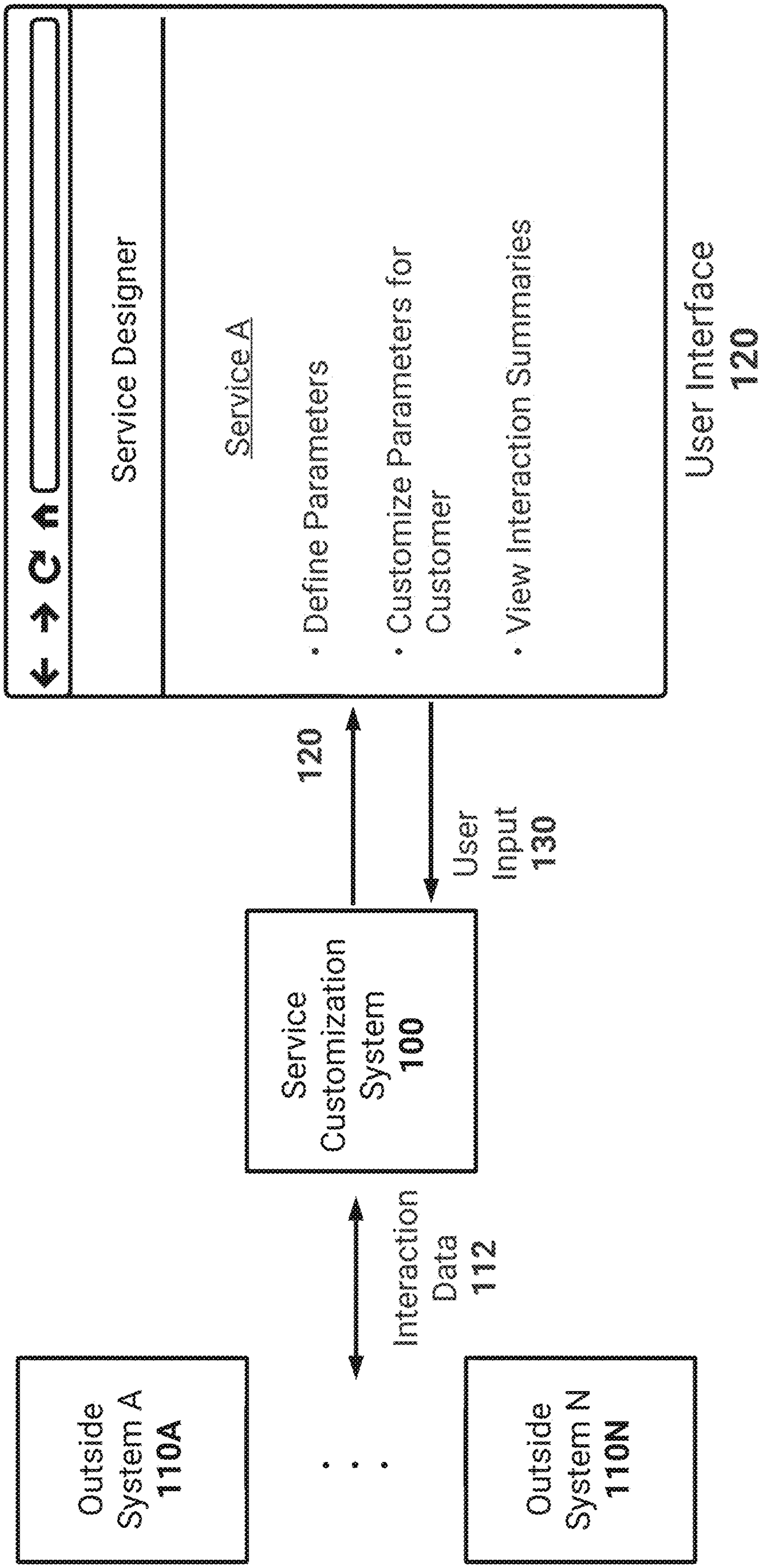
FIG. 1 illustrates a block diagram of an example service customization system responding to user input via an example user interface.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

This application describes techniques to enable rapid customizations to deals that include access, or otherwise offer of, services to entities. A service, as will be described, may include any electronic service, software, web application, product, service (e.g., legal work, creative designs), and so on, which may be offered to an entity as part of a deal. This application describes example user interfaces which may be associated with a web application, or other application, and which seamlessly enable an end-user to define a service and a deal associated therewith. Additionally, the user interfaces may allow for easy customizations to the service or deal which allows for complex customizations by a sales team when engaging with an entity. Advantageously, the user interfaces automate data integration techniques to allow for complex fee, or billing, calculations to be rapidly effectuated based on actual use of a service by an entity. In this way, an offering entity may rapidly offer its services to third-party entities while ensuring that it can flexibly adjust an offer in minutes rather than months as described below.

Commonly, when an offering entity creates a service which is to be offered to receiving entities, the offering entity is required to define a rigid fee calculation technique for the service. For example, an offering entity may create a development tool which is accessible to users of a receiving entity. In this example, each license or seat associated with the development tool may have a fixed fee associated with a time period (e.g., a year, a quarter, and so on). Additionally, the fixed fee may vary according to a number of licenses or seats. However, this may result in an inflexible service which may not appeal to certain receiving entities.

As an example, and as may be appreciated, a receiving entity may prefer paying a fixed fee for a perpetual license. The receiving entity may also prefer paying for an actual amount of time that the development tool is used. At present, tailoring such fee arrangements present great technological hurdles. Indeed, it may take a team months to prepare a new stock keeping unit (SKU) which conforms to these updated preferences.

Current technological schemes to define, and enforce, such fee arrangements rely on bespoke tools which are difficult to update and manage. For example, a development team is typically required to define techniques by which a service is to be charged. As will be described, a service may be associated with dimensions (e.g., pricing dimensions) such as an amount of time a service is used, specific users of the service, a number of deliverable products associated with the service, and so on. For current technological schemes these dimensions are required to be hard coded for a particular service. Additionally, complex computation rules are required to be coded, parsed, and enforced which determine fees associated with a receiving entity's use of a service. For example, these logical rules convert the pricing dimensions into a fee and may be based on large sets of user interaction data with the service. Indeed, an offering entity may be required to code complex database queries (e.g., complex use of SQL) to process received interaction data. Additionally, the offering entity may be required to code techniques to analyze the processed data and then map that information into fee calculations.

The above is required to be validated, such that it may take months of time for the development team to establish techniques by which fees for the service may be determined for large numbers of receiving entities. This results in teams, such as sales teams, being unable to customize a deal for a new receiving entity due to this inflexibility of current technological tools.

In contrast, the disclosed technology describes a web application which enables an end-user to quickly define, and customize, the above-described information. For example, an end-user may use a user interface to rapidly specify dimensions associated with pricing of a service. As another example, the end-user may define complex logical computation rules associated with determining a fee associated with the service. In this way, the disclosed technology allows for a no-code environment that improves upon such prior technological schemes.

The dimensions described herein may be customized by an end-user to allow for pricing on any aspect of a service. For example, a dimension may be assigned a label by an end-user to represent a particular aspect associated with computing a fee. In this example, a user interface may be presented to the end-user who may then provide user input to define one or more dimensions. As will be described, these dimensions may be mapped to data associated with use of a service. For example, a defined pricing dimension may correspond to a particular column of data received in a database table, spreadsheet, and so on. As another example, the defined pricing dimension may also correspond to a combination of data received in database tables, spreadsheets, and so on.

These pricing dimensions form an underpinning of fee calculations associated with a service. Using the web application described herein, the end-user may then define, or otherwise specify, techniques by which a fee is to be computed. In some embodiments, complex computation techniques may be defined by a series of steps. Each step may thus represent a digestible action to be performed using the pricing dimensions optionally along with other information. For example, specific transaction data determined from database tables, spreadsheets, and so on, may be used in a step.

The above information may be used to define the service, such that it may be offered as a deal to receiving entities (e.g., customers, third-party entities). Advantageously, and as will be described at least in FIGS. 4A-4F, a deal may be individually customized and/or tailored for each receiving entity. In contrast to prior software tools, the disclosed technology allows for seamless adjustment to fee calculations for each receiving entity. Advantageously, such customizations may not require creation of new SKUs. Instead, an offering entity may implement negotiated adjustments to a fee calculation in a few user input steps (e.g., clicks, drags, and so on) using the same SKU. Furthermore, the end-user may view real-time estimates associated with fees resulting from customizations. These estimations may be based on, for example, actual interaction data or estimates of interaction data with the service. Thus, customizations may be effectuated in minutes rather than months.

Advantageously, the disclosed technology may receive, and process, interaction data from a multitude of outside systems. For example, a receiving entity may use a service such that fees are calculated based on times of use of the service. In this example, a system described herein may receive (e.g., request data or be pushed data) interaction data representing raw data (e.g., machine data), database tables, and so on, which represents the interaction of the receiving entity with the service. For example, the receiving entity may have 10 users, 100 users, 10000 users, and so on. In this example, use of the service may be monitored or otherwise stored. As an example, information associated with each user's interaction with the service may be stored. Example information may include an amount of time associated with the user, times a license associated with the service was active for a user, and so on.

In an effort to streamline the process by which services may be defined, offered to receiving entities, and then monitored for actual use, the web application includes succinct user interfaces which graphically enable the receipt and aggregation of the interaction data. For example, a user interface may respond to user input associated with defining which data sets are to be aggregated to form information usable to compute fees associated with the above-described service. The user interface may allow for a drag-and-drop experience in which the user is able to define receipt of data sets along with Boolean, or other logical, operations used to compute fees.

In some implementations, the web application includes and/or utilizes one or more machine learning models, such as large language models, to further streamline the process by which services may be defined, offered to receiving entities, and monitored for actual use. For example, the user interface may respond to user input providing sample usage data. The sample usage data may be inputted into the one or more machine learning models to determine information usable to compute fees associated with the service and/or to determine the fees associated with the service.

In this way, the techniques described herein address technological problems and improve upon the functioning of technological systems. For example, prior techniques to define services required complicated code-heavy workflows which reduced the flexibility associated with defining, and offering, modern-day technological services. Furthermore, the prior techniques relied upon piecemeal software to define, offer, and monitor use of a service. In contrast, the disclosed technology is a one stop shop wherein an offering entity may dramatically simplify the technological workflow associated with offering services.

Additionally, the techniques described herein reduce a complexity associated with software user interfaces usable to define services. As will be described, the user interfaces according to the disclosed technology leverage succinct steps and operations which enable a substantially faster time to define services. Advantageously, innovative techniques associated with reducing user input allow for offering entities to rapidly define, offer, and monitor use of, disparate services. Furthermore, these services may be rapidly customized in a no-code fashion These and other aspects of the disclosed technology will now be described in more detail.

Block Diagrams

FIG. 1 illustrates a block diagram of an example service customization system 100 responding to user input via an example user interface 120. As will be described, the service customization system 100 may receive user input associated with defining, and monitoring use of, one or more services offered by an entity. For example, user interface 120 includes options associated with defining "Service A." Once defined, and utilized a receiving entity, interaction data 112 may be received to determine fees associated with Service A.

As described herein, a service may represent anything which is discretely billable according to parameters. For example, a service may represent software which is being sold, licensed, or otherwise utilized, by receiving entities. In this example, a service may include an application (e.g., a mobile application) which is used by end-users. As another example, a service may include software which is accessible via a website. For this example, the software may be a web application which is accessed by end-users. A service may also represent licenses to information. For example, a dataset may be used as training data for disparate machine learning models. In this example, receiving entities may acquire licenses to access the dataset. A service may also represent any physical product which is offered to receiving entities. For example, a service may include an IP core, an application specific integrated circuit, a processor, and so on. A service may also represent a service offered by an entity to receiving entities. As may be appreciated, the techniques described herein may be applicable to a variety of services, such as the above-described examples, and may include combinations of services.

In FIG. 1, user interface 120 may be presented via a user device of a user. Example user devices may include a laptop, a computer, a tablet, a wearable device, and so on. The user interface 120 may therefore be rendered, at least in part, via the user device. Information included therein may be provided via the service customization system 100. For example, the user interface 120 may be associated with a front-end of a web application which is used by the user.

The service customization system 100 may represent a system of one or more computers, one or more virtual machines executing on a system of one or more computers, one or more services or applications executing on a system, and so on. The service customization system 100 may therefore execute, and enable access to, the above-described web application. For example, users associated with an entity may be associated with log-in information. In this example, individual users may leverage the user interface 120 to define services as described herein.

The outside systems 110A-110N (e.g., outside system A) may represent systems which provide interaction data 112 associated with Service A. As described herein, interaction data 112 may represent any information which is usable to determine fees associated with Service A. For example, as may be appreciated a particular service may be associated with fees according to an amount of time of the particular service was used. In this example, software may be run on end-user devices of a receiving entity. As the software is used, a tool, agent, or software, may monitor the amount of time. For example, outside system 110A may be associated with the receiving entity and may aggregate this time information for the end-users. The time information may be provided by outside system 110A to the service customization system 100 as interaction data 112. As will be described, the interaction data 112 may be used by the system 100 to accurately, and automatically, determine fees associated with Service A.

The above-described example of interaction data 112 related to amounts of time individual end-users used Service A. As will be described, any dimension may be used to inform fee determinations of a receiving entity. For example, time may represent a dimension. As another example, a dimension may relate to a number of licenses to software which are used by end-users. As another example, a dimension may relate to a number of a physical product used by end-users.

As will be described, the interaction data 112 may be ingested by the service customization system 100. Example user interfaces will be described, for example in FIGS. 5A-5E, which enable a user of the system 100 to define techniques by which the interaction data 112 is ingested. Additionally, the interaction data 112 may be transformed, or otherwise adjusted or analyzed. For example, the interaction data 112 may be analyzed to map the information to dimensions which are usable to determine fees associated with Service A.

In user interface 120, an end-user is defining Service A. The illustrated example includes an option to "Define Parameters," which as described above may represent pricing dimensions usable to determine fees. Example parameters may include an amount of time of use of Service A, a number of copies, a number of licenses, a number of processes executing in a period of time, or any arbitrary dimension which may be quantifiable.

To define parameters, the end-user may provide user input 130 to the service customization system 100. Example user input may include interactions with the user interface 120. For example, the user input may include keyboard/mouse input. As another example, the user input may include touch-based input. In some embodiments, the end-user may provide verbal or textual input associated with actions to be taken by the system 100. For example, a large language model may respond to the user input 130 and effectuate actions.

The parameters may thus form an underpinning of techniques by which fees for Service A are determined. For example, and as described above, an amount of time of use may be a parameter. The interaction data may indicate, for example for each end-user of a receiving entity, an amount of time Service A was used by the receiving entity. Thus, this interaction data may be mapped to the time-based dimension. Additionally, and as may be appreciated, multiple dimensions may work in aggregate to determine fees. For example, time may represent a first dimension. In this example, a number of active processes may represent a second dimension. The user of user interface 120 may indicate that fees are based on a combination of these dimensions. For example, these dimensions may be used to inform more complicated fee information. As an example, fees may be based on a measure of central tendency of active processes and adjusted according to time. For this example, fees may be based on a number of users who typically utilize the software with slight adjustments upwards or downwards according to users who briefly use the software.

As will be described once the parameters are defined the user of the user interface 120 may determine fee calculation information. Advantageously, the fee calculations may be based on the parameters and optionally any extraneous data which may be imported into the service customization system 100. Additionally, the fee calculations may be formed from arbitrarily complex logical expressions. Thus, the user may define fee calculations which may be textually defined using, at least, the parameters. The fee calculations may additionally include logic, such as Boolean logic. As an example, fees may be distinct depending on a number of active processes associated with Service A in a period of time. Thus, discounts may be automatically calculated and applied by the service customization system 100 based on analyzing the interaction data 112.

In contrast to prior technological schemes and tools, the disclosed technology allows for seamless customization of Service A for receiving entities. For example, fee calculations may be customized for a particular receiving entity (e.g., as a result of negotiations). Customization may include reducing fees for the same interaction data, that is giving the particular receiving entity a discount. This customization may thus leverage the same dimensions and fee calculation techniques. However, other customizations may utilize different dimensions. For example, a receiving entity may prefer to pay based on a number of active applications used in a particular time period. In this example, the existing fee calculation technique may be based on an amount of time that the receiving entity uses applications in the particular time period. Thus, the customizations may allow for rapid adjustment of pricing based on analysis of specific dimensions which can be any arbitrary, measureable, property. As described herein, interaction data may be received which informs the measurement of a dimension. In this way, creative and unique pricing may be effectuated based on a customer's preference. Advantageously, such pricing may be with a same SKU such that complex back-end requirements of companies regarding different SKUs may be avoided and instead the simplicity of customized pricing for a same SKU may be implemented.

Advantageously, such customizations may be effectuated in substantially real-time. For example, the customizations may be associated with Service A sch that different SKUs are not needed. Instead, the service customization system 100 may divorce such customizations from the underlying service associated with Service A. In this way, the system 100 may automatically determine fees for individual receiving entities according to different techniques.

Additionally, estimates of such customizations may be presented to a receiving entity in substantially real-time. For example, historical interaction data 112 associated with Service A may be used to inform the estimates. In this example, the interaction data may be analyzed (e.g., transformed) and used in a customized fee calculation. In some embodiments, a generative model may be used to generate example interaction data for use in such estimates. For example, an existing receiving entity may be associated with interaction data 112 that is able to be transformed into particular dimensions. These dimensions may then be used to determine fees.

However, a new receiving entity may prefer a different fee determination. Thus, the interaction data may not include information sufficient to determine an estimate for this different fee determination. For this example, the system 100 may thus use a generative model (e.g., generative machine learning model) to include example information which is sufficient to estimate the different fee determination. In some embodiments, example information may be input according to estimates provided by the receiving entity (e.g., estimates of usage, which may be based on estimates of use of other offering entities' software).

In this way, an offering entity, such as the user of user interface 120, may customize the underlying dimensions, fee calculations, and so on, which are to be used by a receiving entity. As may be appreciated, such customizations may be performed in substantially real-time when meeting with the receiving entity. Prior techniques require inflexible bespoke tools which would take weeks or months of time to set up. Thus, the disclosed technology allows for offering entities to substantially reduce the time associated with negotiating, and onboarding, receiving entities.

User interface 120 further includes an option to view interaction summaries. These summaries may include charts, reports, and so on, which are associated with use of Service A. The summaries may reflect information from all, or a subset of, receiving entities which are using Service A. For example, the user of user interface 120 may view a chart describing fees associated with usage of Service A in a particular time period. As another example, the user may view a chart describing fee estimates in a future time period. These estimates may be based on historical information. As another example, the user may simulate effects of changing dimensions, fee calculations, and so on, associated with Service A. These simulations may be based on historical interaction data 112.

Example Flowcharts/User Interfaces

Figure 2:
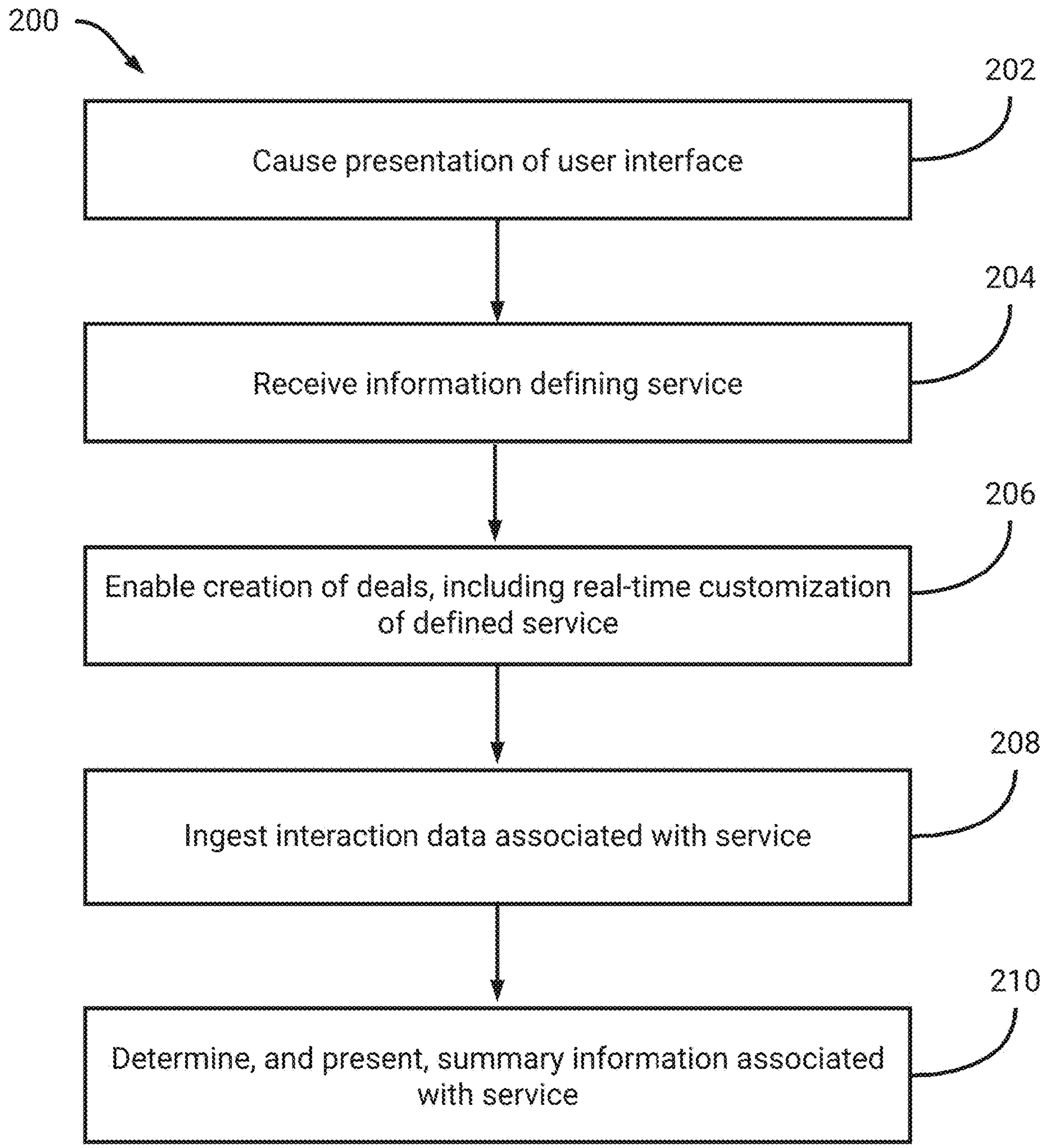
FIG. 2 is a flowchart of an example process for determining information associated with a service.

FIG. 2 is a flowchart of an example process 200 for determining information associated with a service. For convenience, the process 200 will be described as being performed by a system of one or more computers (e.g., the service customization system 100).

At block 202, the system causes presentation of a user interface. As described in FIG. 1, the user interface may be presented via a user device of a user. In some embodiments, the user interface may be presented via an application (e.g., mobile application) or web application on the user device.

At block 204, the system receives information defining a service. As described herein, the service may be defined according to dimensions (e.g., pricing dimensions) which are usable to determine fees associated with the service. Example user interfaces to define dimensions will be described in more detail below, with respect to FIGS. 3A-3E.

The system uses the above-described dimensions in one or more logical expressions, formulas, and so on, to determine fees. These logical expressions may be arbitrarily complex and include logical operators, comparisons, and so on. Thus, complex fee calculations may be succinctly baked into the service in a no-code fashion.

At block 206, the system enables creation of deals. An offering entity may create deals with receiving entities for use of, access to, or receipt of, the defined service. For example, a user of the offering entity may meet with one or more people at a receiving entity. In this example, the user may utilize example user interfaces described herein (e.g., in FIGS. 4B-4F) to create a deal with the receiving entity.

A deal may include an agreement as to the specific fee calculation technique to be used for the service. For example, the receiving entity may agree that licenses to software may be associated with a particular fee. As another example, the receiving entity may agree that access to software is based on an amount of time used. As another example, certain limits or thresholds may be associated with a deal. For example, a maximum fee may be determined. As another example, maximum numbers of licenses, usage times, and so on, may form part of a deal.

Advantageously, and as will be described, a deal may be rapidly customized. For example, the system may receive user input associated with customizing the service. In this example, the customizations may relate to customizations of the above-described dimensions. The customizations may also relate to customization of fee calculations. The customizations may also relate to customization of the above-described limits or thresholds.

The above-described customizations may be associated with the defined service. For example, these customizations may be rapidly prepared (e.g., in substantially real-time) and, once agreed upon, stored by the system for use in determining fee information.

At block 208, the system ingests interaction data associated with service. As will be described below, for example in FIGS. 5A-5E, the system ingests interaction data representing, for example, usage information associated with the service. For example, different receiving entities who agreed to respective deals may generate information which is indicative of use of the service.

As an example, access to the service may be via software executing on systems operated, or otherwise associated with, a receiving entity. As users of the receiving entity use the software, the systems may generate data (e.g., machine data) which stores information associated with the use. Example information may include an identification of the end-users. Example information may also include amounts of time the software was used. Example information may also include complexity of the interactions or processing performed by the system. Example information may also include functionality performed by the software (e.g., different application programming interfaces, functions, and so on, may be associated with different fees). The above-described information may be stored in datasets, such as database tables. The system may receive these datasets and analyze them to determine fee information. As will be described, a user may use the user interfaces described herein to quickly effectuate receipt and processing of the datasets.

As another example, access to the service may be via a web application. For this example, systems (e.g., cloud systems) which execute the web application may generate data information associated with use. Similar to the above, this information may be stored in datasets which are analyzed via the system.

Advantageously, the user interfaces described herein may provide instructions and techniques for the system to analyze the interaction data. As may be appreciated, certain datasets may include information relevant to determining fee information. Information may be spread between these datasets such that techniques are required to extract, and modify or map, information between the datasets. As will be described below, an example user interface may allow for complex analysis of datasets using simple user interface options. For example, a user may rapidly provide techniques by which the system is able to receive, analyze, and then map information into fee calculation techniques.

The user interfaces may use, for example, drag and drop graphical techniques which leverage existing functions. Thus, a user may indicate that a union of certain information in particular datasets mis to be performed. The user may combine these existing functions, or optionally create new functions, using graphical techniques which allow for an easy-to-understand view into how interaction data is processed.

At block 210, the system determines and presents summary information associated with the service. As the service is utilized by receiving entities, a user of the system may view summary information associated with the use. For example, summary information may include graphical representations of fees which may be filtered according to receiving entity, time, and so on. The system may also present summary information reflecting use information for all, or specific, receiving entities. Example use information may be derived from the received interaction data and may provide insights into how end-users are leveraging the service.

Furthermore, summary information may indicate expected fees, or usage, of the service over a future period of time. For example, this information may be derived based on usage or fee trends of the service which are extended to the future period of time. In some embodiments, statistical techniques may be used to determine the future information. In some embodiments, machine learning models may be used to determine the information.

Figure 3A:
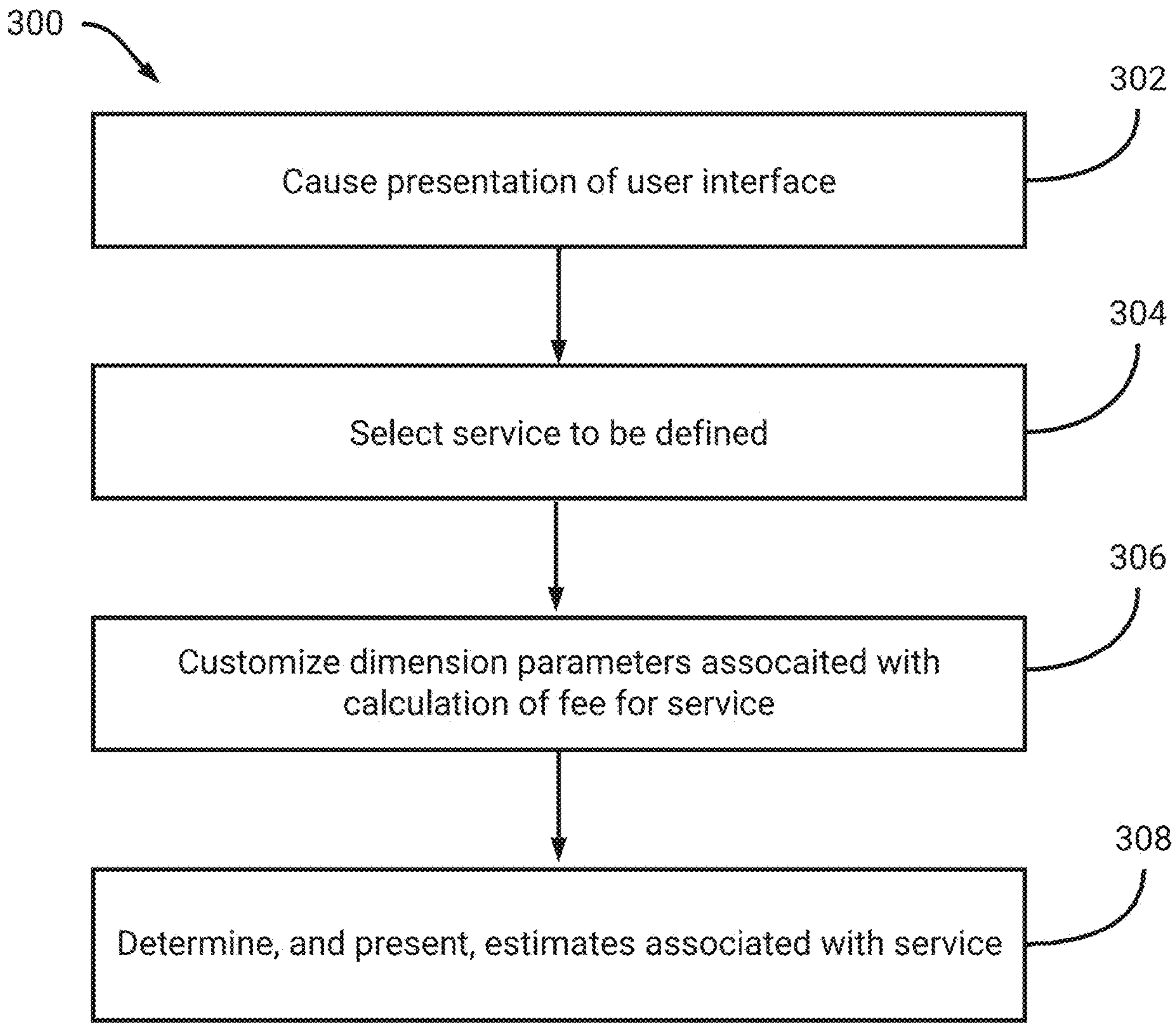
FIG. 3A is a flowchart of an example process for determining estimates associated with a service.

FIG. 3A is a flowchart of an example process 300 for determining estimates associated with a service. For convenience, the process 300 will be described as being performed by a system of one or more computers (e.g., the service customization system 100).

At block 302, the system causes presentation of a user interface. As described herein, the user interface may be associated with an application (e.g., a mobile application, a web application) which is rendered on user devices of users.

At block 304, the system receives selection of a service to be defined. A user of the user interface may define a name, and other information, associated with the service. For example, the information may include a logo associated with the service. As another example, the information may include a description of the service, a geographic region associated with its use, and so on.

At block 306, the system customizes dimension parameters associated with a fee calculation. As described above, the system may receive information enabling automated determination of fees for use of the service. For example, a fee calculation may be described by a user of the user interface using, e.g., logical expressions. The fee calculations may be customized when offering deals associated with the service to receiving entities. For example, different dimensions associated with fees may be used. As another example, different fee calculations may be used.

At block 308, the system determines estimates associated with the service. As described herein, the estimates may reflect anticipated, or actual, use of the service by receiving entities.

Description will now turn to example user interfaces associated with the process 300. The user interfaces may represent user interfaces rendered by a system or user device. The user interfaces may additionally be interaction and respond to user input, such as touch-based input, verbal input, mouse/keyboard input, and so on.

Figure 3B:
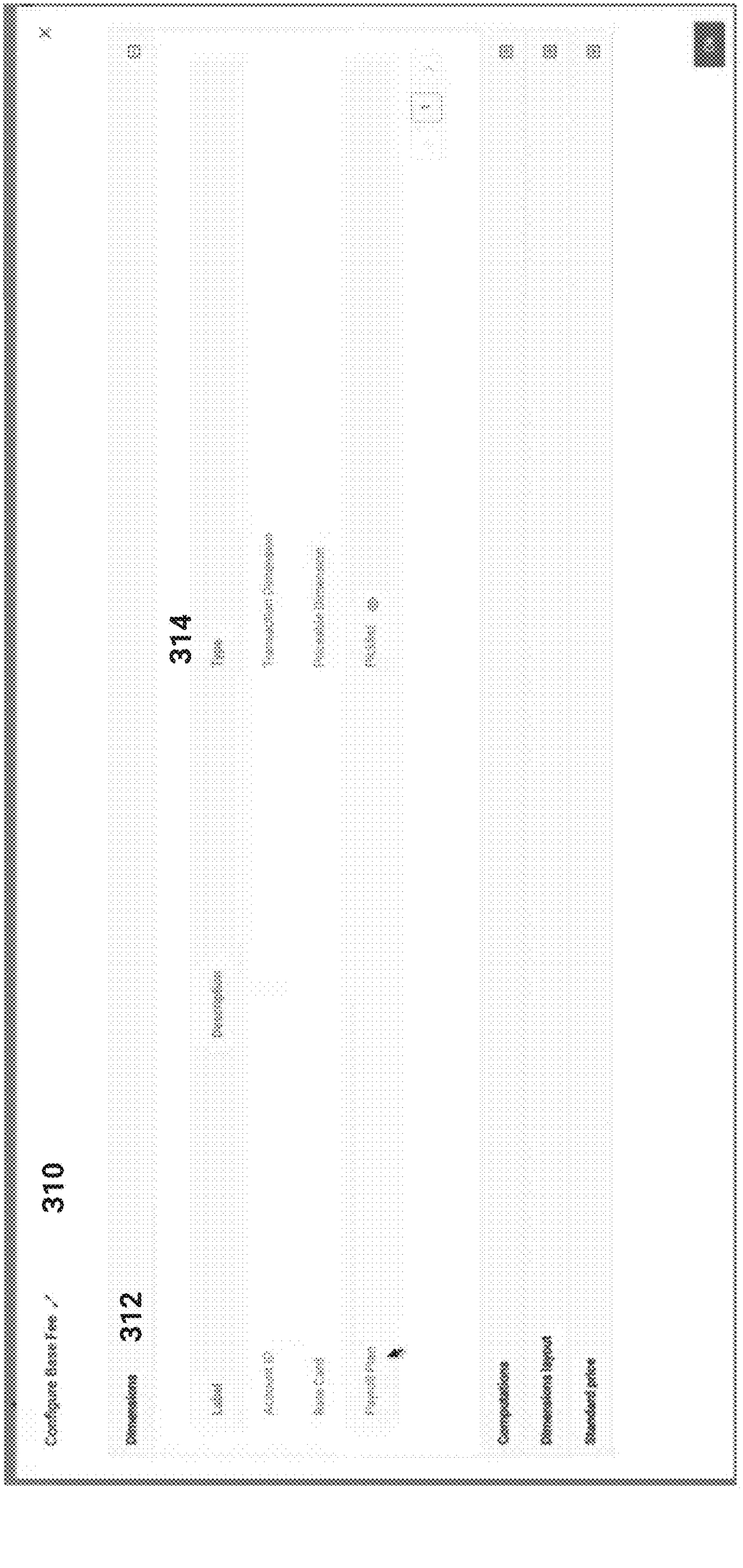
FIG. 3B is an example user interface associated with defining a service.

FIG. 3B is an example user interface 310 associated with defining a service. The user interface 310 allows for defining dimensions 312 associated with calculation of fees. In the example, certain dimensions 312 are illustrated as such as account ID, rate card, payroll plan, and so on. As may be appreciated, these dimensions may be arbitrarily defined such that any information may form part of a technique by which fees are calculated. Additionally, for any dimension a type may be assigned.

Example types 314 include, e.g., transaction dimension, priceable dimension, picklist, and so on. A transaction dimension may include information which is indicative of a column (e.g., a user identity) associated with transactions in a dataset. Thus, transactions may be associated with certain end-users (e.g., account ID in user interface 310). A priceable dimension may include information relevant to determining fees. A contract dimension may include information associated with a deal, such as receiving entity specific information.

Figure 3C:
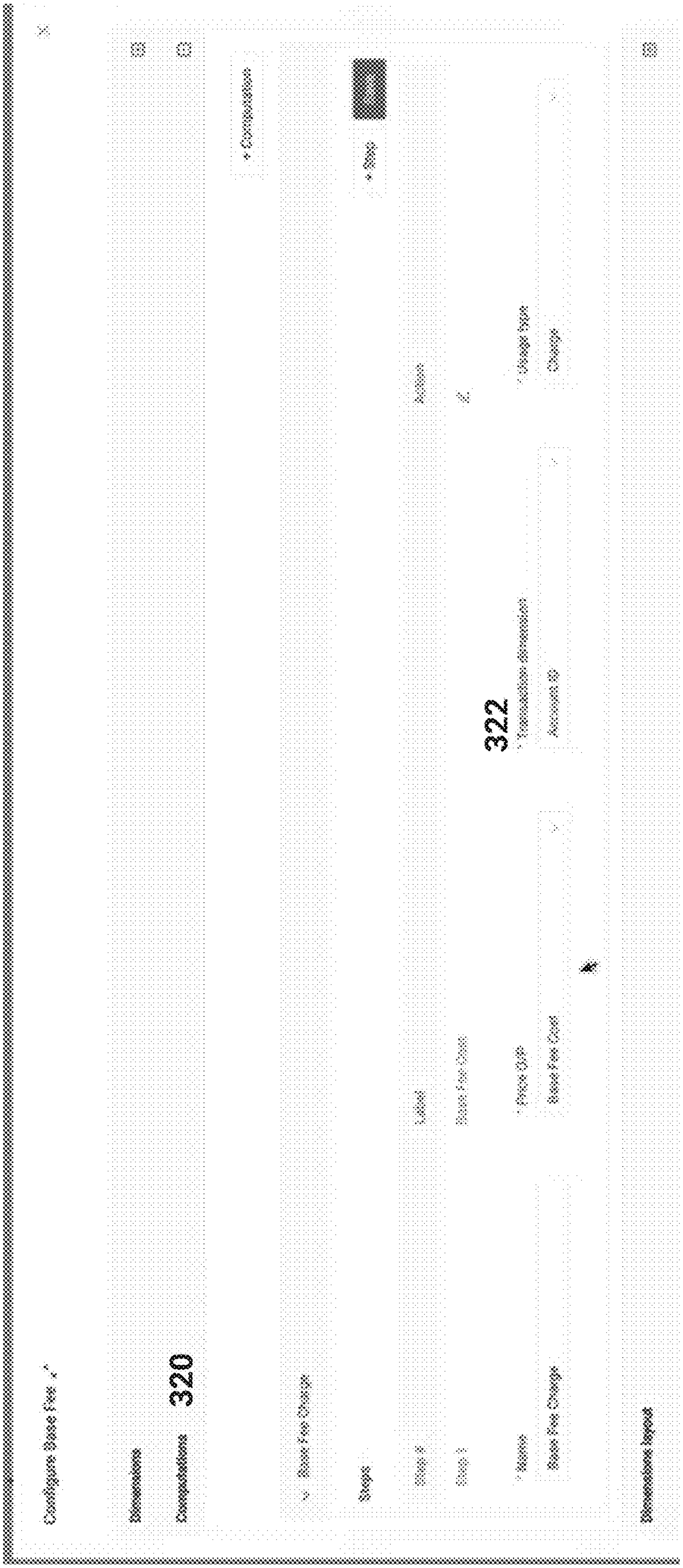
FIG. 3C is an example user interface for defining fee information associated with the service.

FIG. 3C is an example user interface 320 for defining fee information associated with defining the service. As described herein, the dimensions may form part of a fee calculation for the service. In the illustrated example, a particular step (e.g., step 1) of a potentially multi-step or part process to determine fees is included. As illustrated, the step includes reference to one of the previously-defined dimensions 322.

Figure 3D:
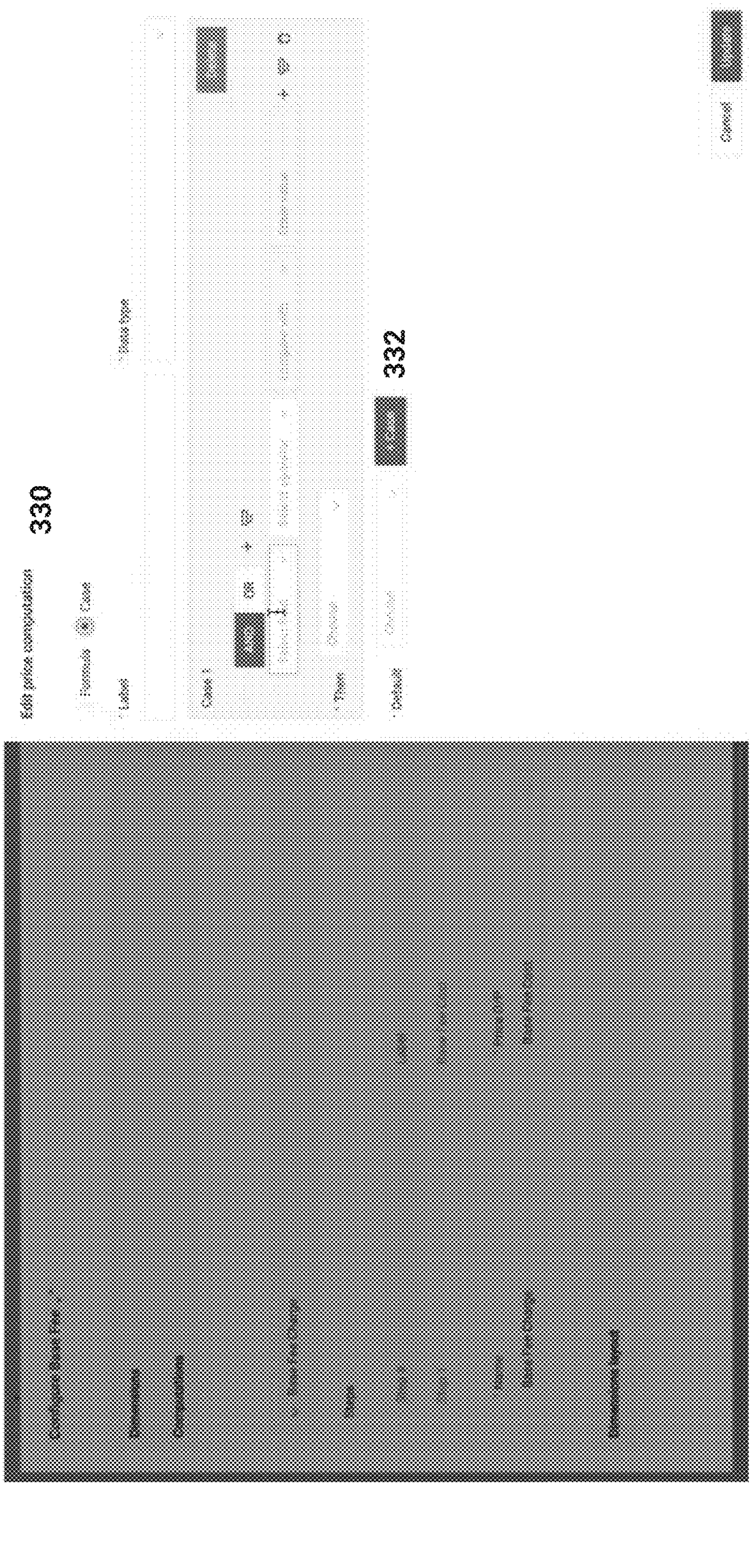
FIG. 3D is another example user interface for defining fee information.

FIG. 3D is another example user interface 330 for defining fee calculations. User interface 330 may be accessed via user input to user interface 320. This example user interface 330 includes functionality associated with defining a fee calculation. For example, the user interface 330 may enable receipt of logical expressions associated with the fee calculation. In this example, the logical expression may include use of operators (e.g., 'And', 'OR', and so on). Additionally, the logical expression may include use of if, then, statements.

User interface 330 includes reference to 'Case 1' and has an option 332 to add a new case. As may be appreciated, the user interface 330. May therefore allow for multiple cases which work in concert to determine fee information for the service. For example, the cases may be logically chained together.

Figure 3E:
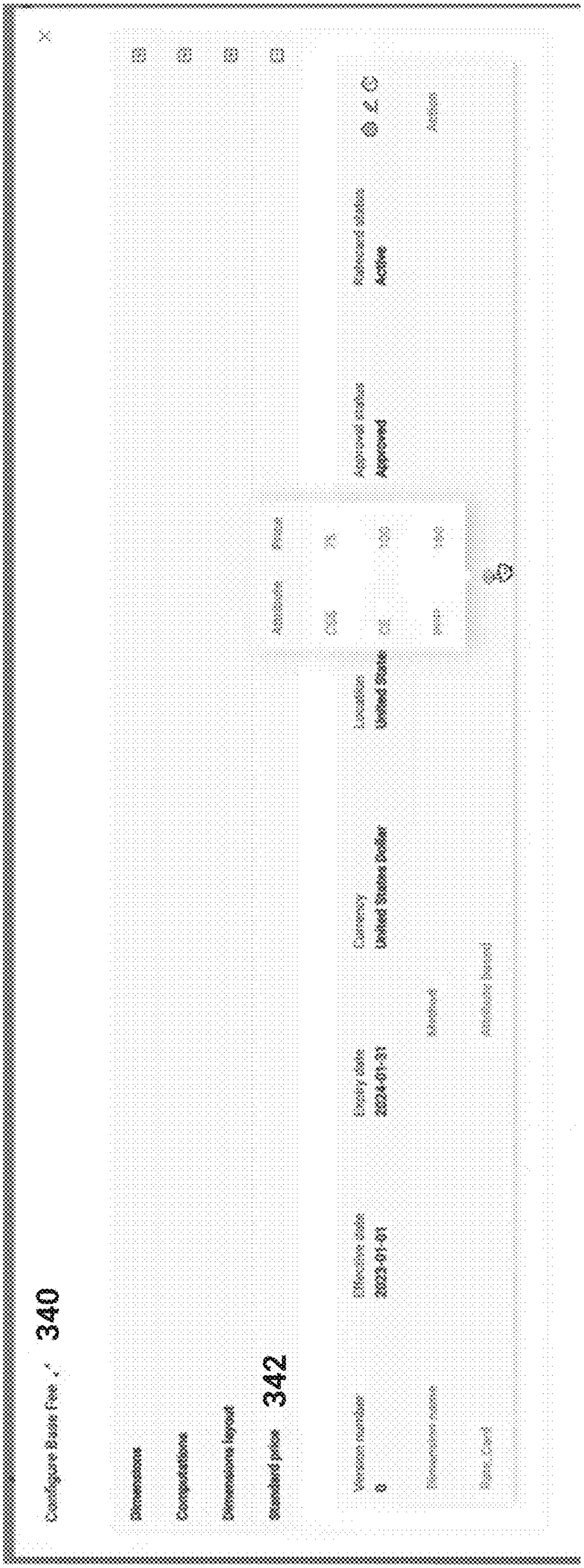
FIG. 3E is an example user interface presenting fee information.

FIG. 3E is an example user interface 340 presenting fee information 342. The standard price portion indicates example attributes such as CSS, CE, PPP, and so on. These may represent information included in received interaction data.

Figure 3F:
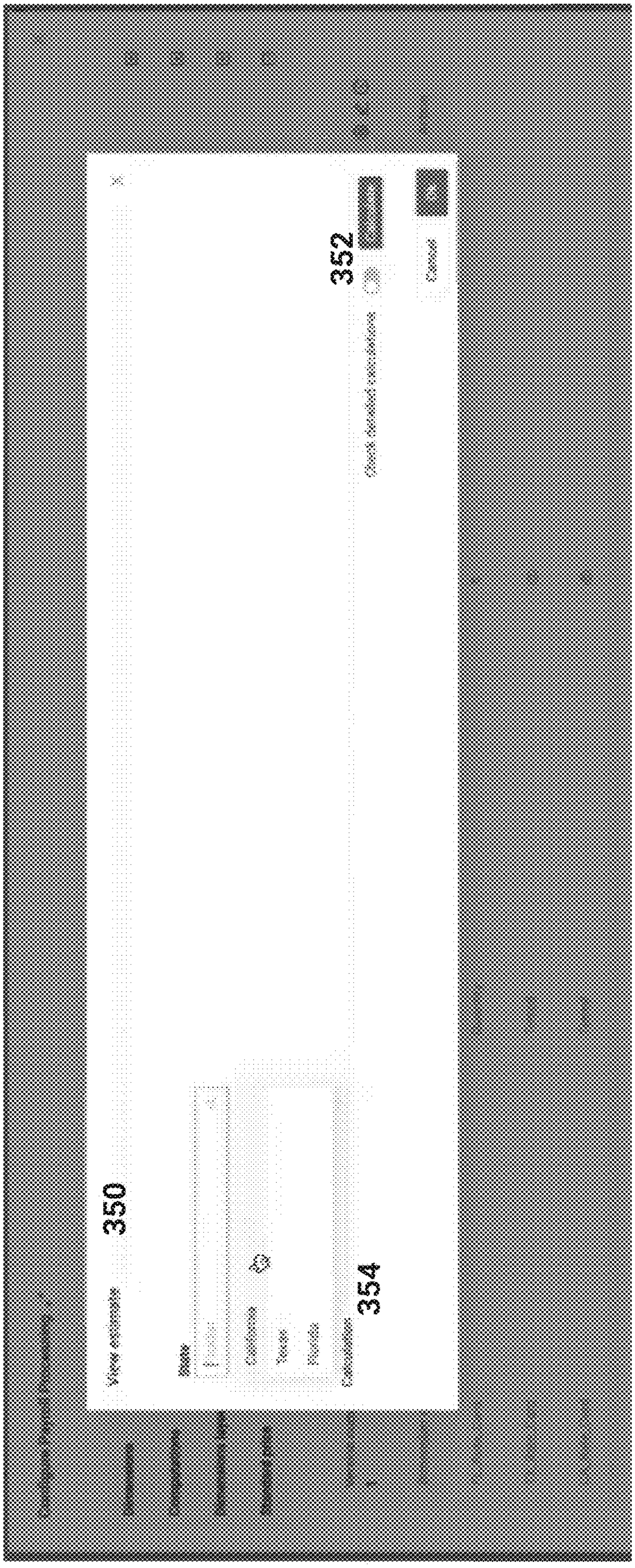
FIG. 3F is an example user interface for estimates associated with service.

FIG. 3F is an example user interface 350 for estimates associated with service. As described herein, estimates may be determined based on estimated, or actual, usage of the service. Additionally, the system described herein allows for enhanced flexibility with respect to rapidly adjusting fee calculations for different geographic regions. In the illustrated example, states are included (e.g., California, Texas, Florida) as an example geographic region. Thus, when determining estimates, the system relies upon customizations for fee calculations according to state.

User interface 350 further includes an option to present detailed calculations. The detailed calculation may include presentation, for example in portion 354, of specific calculations which were used to form the estimates. For example, a portion of estimated, or actual, usage of the service (e.g., interaction data) may be included in portion 354. In this example, the specific fee calculations that use the interaction data may be included such that the user of user interface 350 may confirm the validity of the estimate.

Figure 4A:
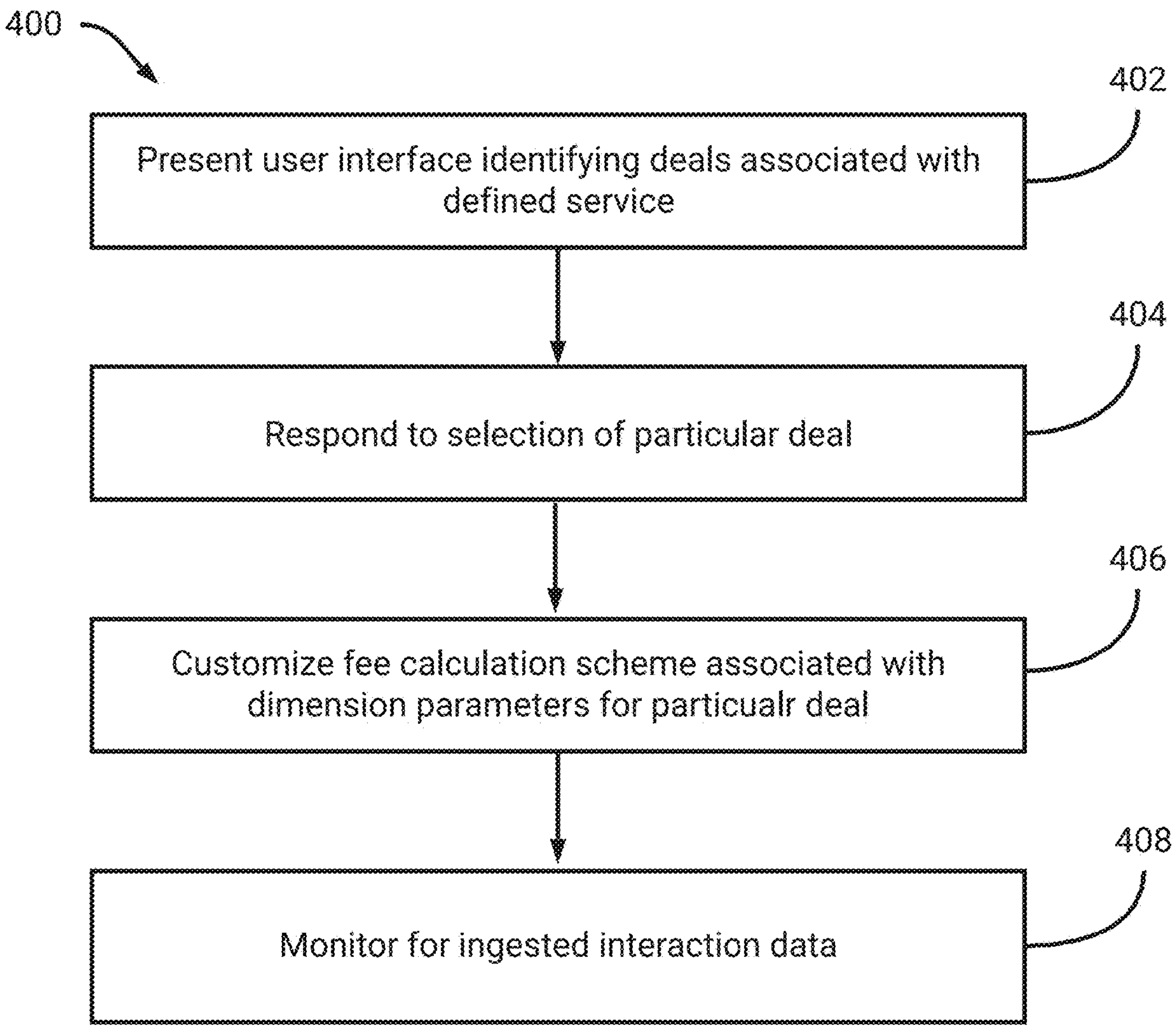
FIG. 4A is a flowchart of an example process for customizing a deal and monitoring for interaction data associated with the deal.

FIG. 4A is a flowchart of an example process 400 for customizing a deal and monitoring for interaction data associated with the deal. For convenience, the process 400 will be described as being performed by a system of one or more computers (e.g., the service customization system 100).

At block 402, the system presents a user interface associated with a defined service. As described in FIGS. 3A-3F, the system presents user interface associated with defining a service. The user interfaces, for example, allow for a user to define dimensions, fee calculation information, and so on using a succinct, no-code, application. When creating deals to be offered to receiving entities, a user may thus select from among previously defined services. In some implementations, the user is prompted to provide sample usage data associated with the defined service and/or to provide a language prompt associated with the defined services.

At block 404, the system responds to selection of a particular deal. The system allows for creation of a deal which may then be discussed, or otherwise provided, to a receiving entity. For example, the deal may include details associated with the previously-defined fee calculation. The deal may additionally include time information associated with a start and end date.

Optionally, the deal may include estimates associated with use which may be tailored to a receiving entity. For example, the system may obtain information indicating an expected number of users, expected amounts of use, and so on. In some embodiments, the system may automatically obtain this information according to historical information associated with other entities.

At block 406, the system customizes the fee calculation. As described above, the user may rapidly customize details of the deal while preserving information associated with the service. For example, the fee calculation may be adjusted based on discussions or negotiations with the receiving entity. Advantageously, since the techniques described herein separate the definition of a service from its associated fee calculations, the customization may not require different SKUs. In some implementations, the system may customize the fee calculation by inputting sample usage data associated with the defined service into one or more machine learning models, such as large language models. The machine learning models may determine the fee calculations based on the sample usage data and/or based on a language prompt provided to the user interface.

At block 408, the system monitors for ingested interaction data. Once a deal is agreed upon, for example optionally with customizations, interaction data associated with use of the service may be received. Techniques to define receipt, and analysis, of such interaction data is included below with reference to FIGS. 5A-5E.

Figure 4B:
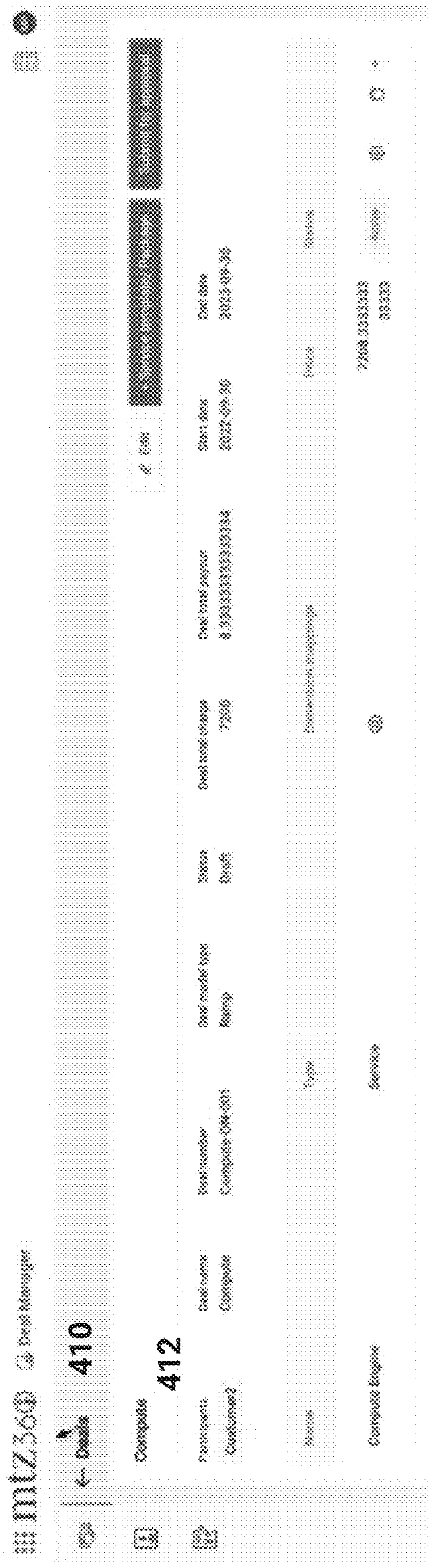
FIG. 4B is an example user interface that includes summary information associated with a deal.

FIG. 4B is an example user interface 410 that includes summary information 412 associated with a deal. The summary information 412 indicates an example receiving entity (e.g., 'Customer2') along with a name for the deal. The information 412 indicates that the deal is a 'Draft', reflecting that it has not been approved by the offering and receiving entities. Additionally, a total charge is included. For this example deal, a fixed fee may be used.

Figure 4C:
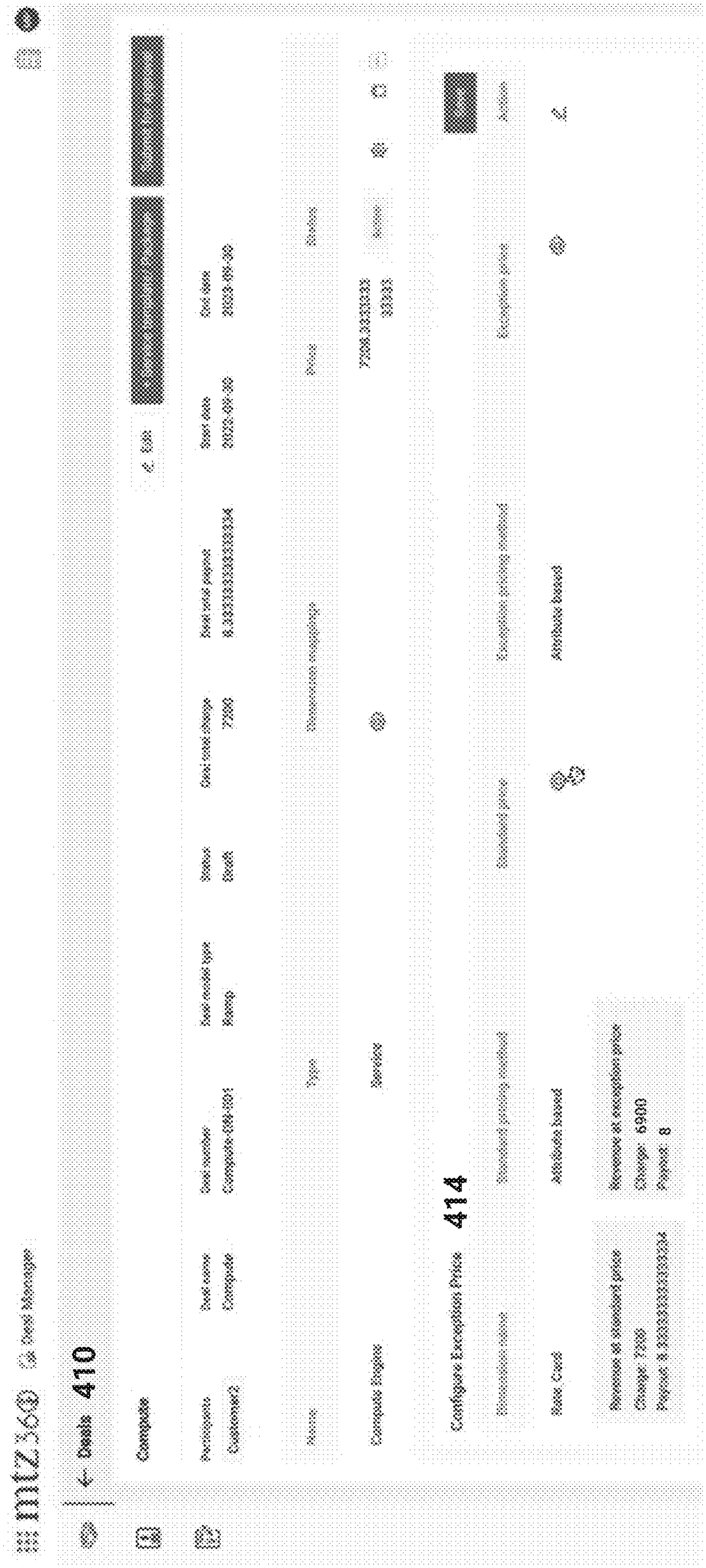
FIG. 4C is another example user interface that includes summary information associated with a deal.

FIG. 4C is another example user interface 410 that includes summary information 414 associated with customizing a deal. The summary information reflects an option to 'configure exception pricing,' which indicates that the fee information is to be customized for this deal. The user interface 410 indicates distinctions between the standard price and the exception (e.g., customized) price. For example, the charge is 7200 at the standard and 6900 at the exception.

Figure 4D:
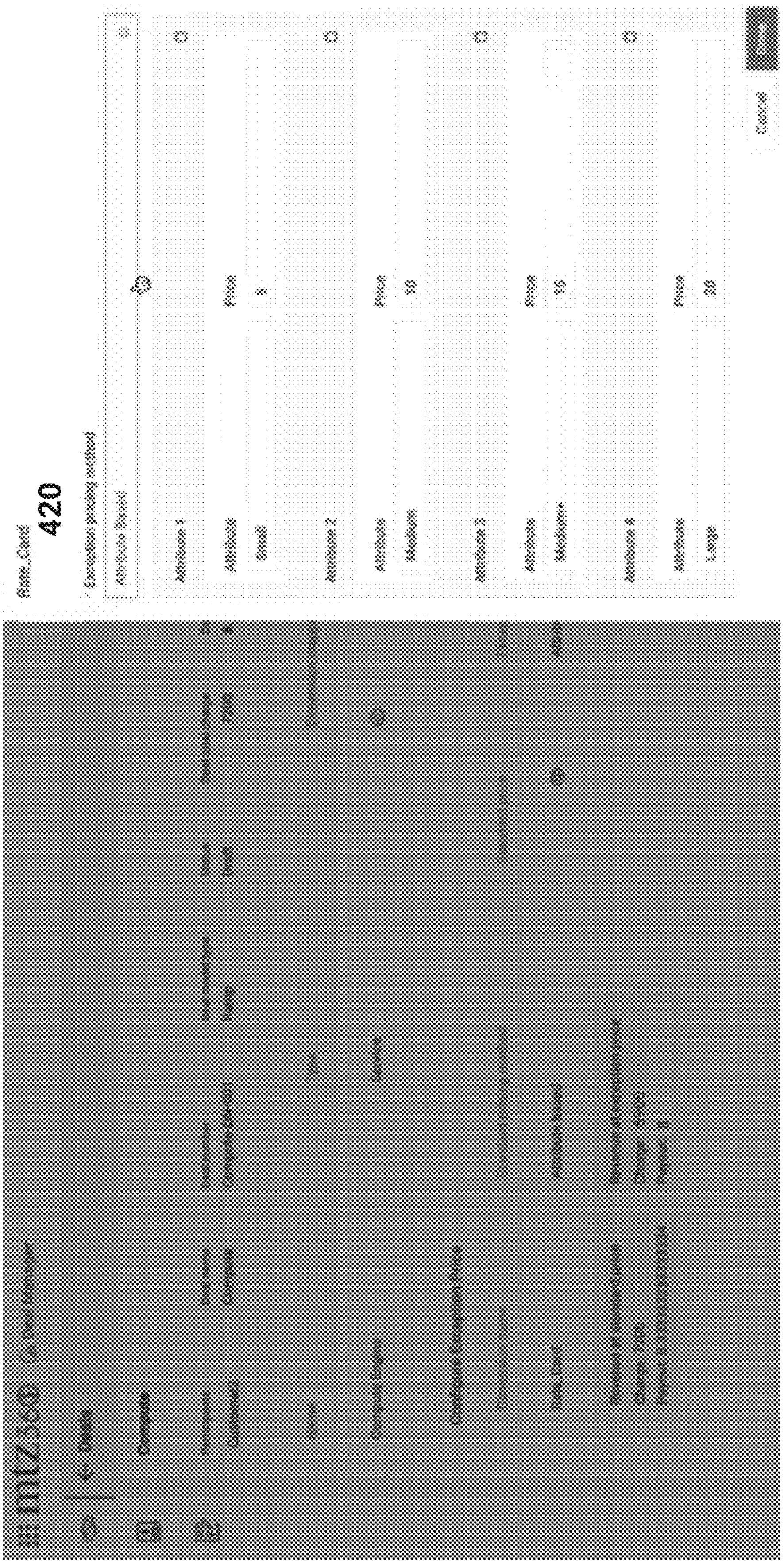
FIGS. 4D-4F are example user interfaces associated with customizing the deal.
Figure 4E:
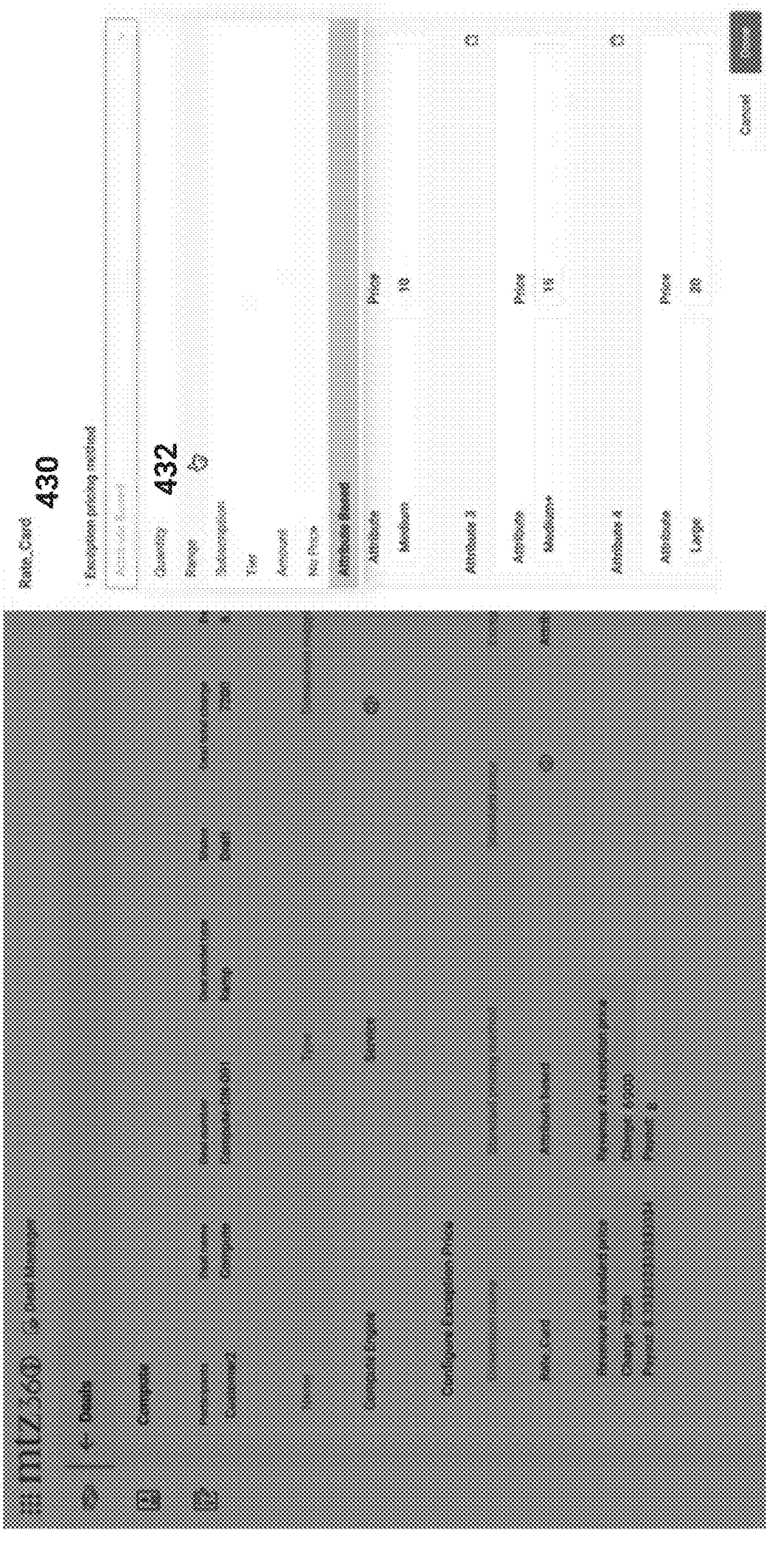
Figure 4F:
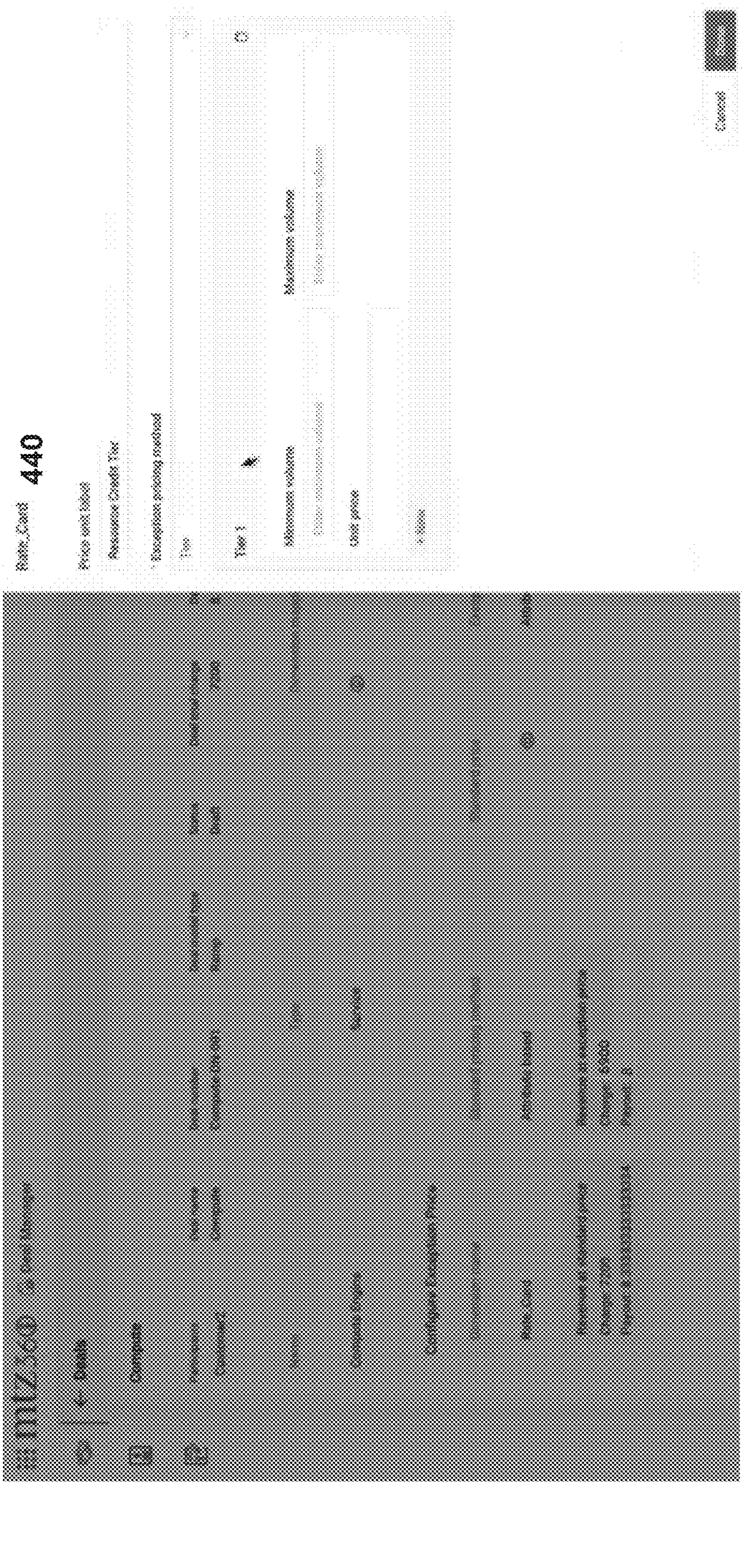

FIGS. 4D-4F are example user interfaces associated with customizing the deal. FIG. 4D illustrates user interface 420 which responds to user input associated with customizing fee calculations. For example, in the illustrated example the user has customized the price for different attributes associated with pricing. The attributes may indicate, for example, numbers of a product associated with a service (e.g., a number of software licenses). The attributes, such as small, medium, and so on, may be associated with pricing dimensions for the service. For example, a pricing dimension may relate to a number of products and the attributes may be defined as thresholds associated with these numbers.

Thus, user interface 420 may allow for an adjustment of the attribute threshold and/or the price associated with these attributes.

FIG. 4E illustrates user interface 430 which includes detail associated with a pricing method. In the example of FIG. 4D, the pricing method (e.g., fee calculation technique) is indicated as being attribute based. To customize the deal, the user may adjust the pricing method via selection of one of the options 432.

FIG. 4F illustrates user interface 440 which includes a new pricing method (e.g., tier-based pricing). To customize the deal, the user has adjusted the underlying fee calculation technique to be tier pricing. Thus, the user has substantial variability with respect to customizing deals for receiving entities.

FIGS. 5A-5E are example user interfaces associated with ingesting interaction data from different systems or components. As described above, interaction data may be ingested such that fee calculations may be automatically determined for a service.

Figure 5A:
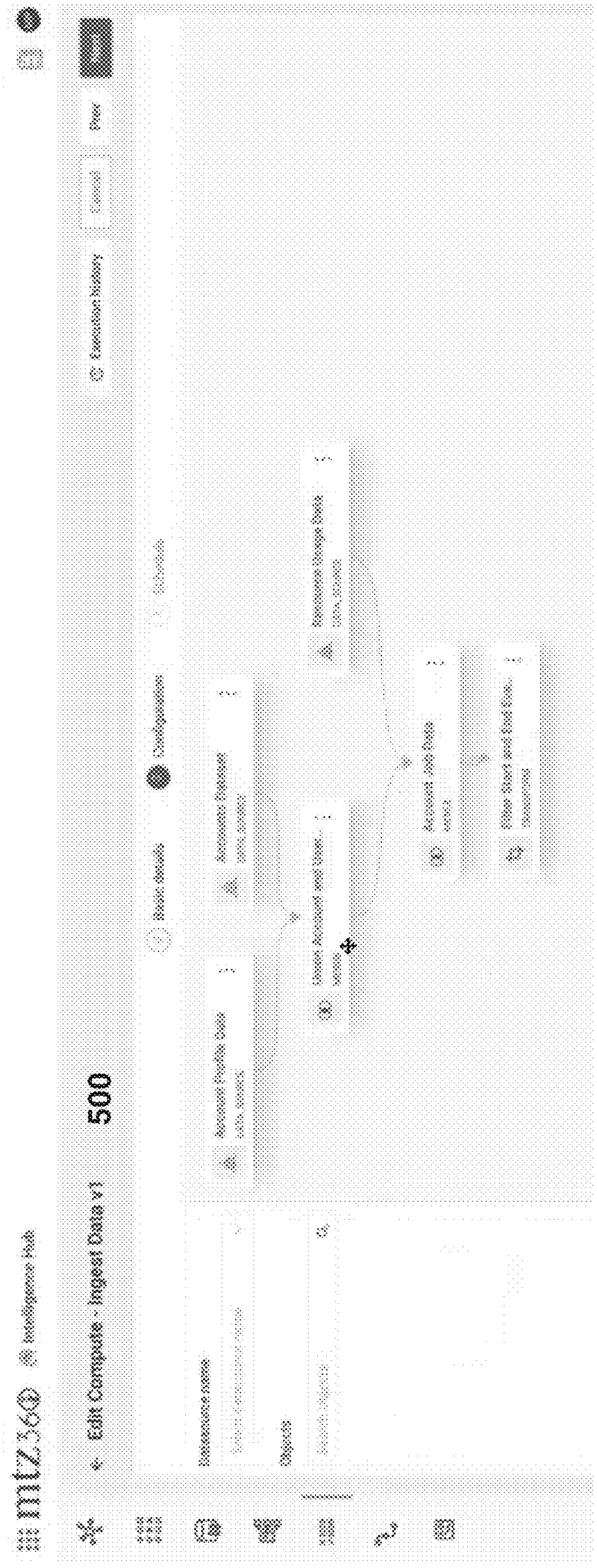
FIGS. 5A-5E are example user interfaces associated with ingesting interaction data from different systems or components.

FIG. 5A illustrates a user interface 500 which includes graphical representation of an overview of receiving, and processing, datasets. For example, the in the illustrated example, different datasets are defined at the top (e.g., account profile data, account dataset). These datasets may be defined by the user via dragging and dropping a graphical element associated with receipt of a dataset. An example of such a graphical element is described in FIG. 5C.

Figure 5B:
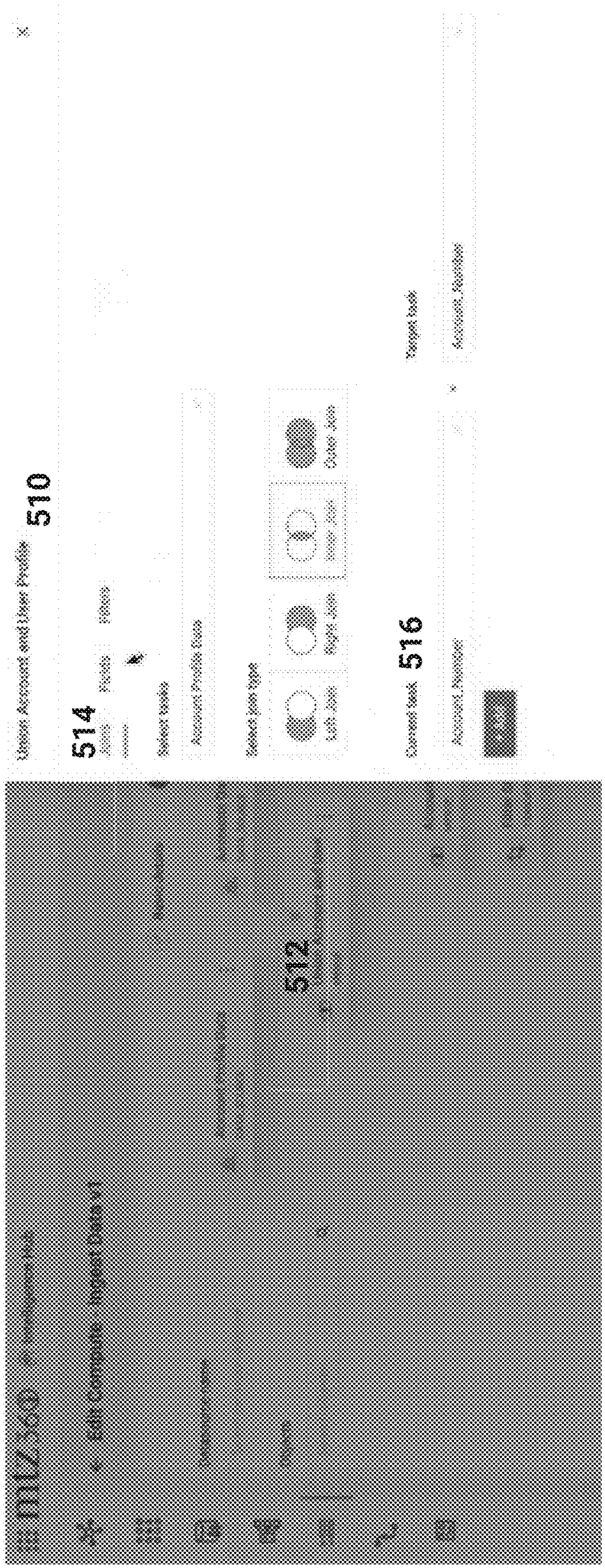

FIG. 5B illustrates user interface 510 which includes detail for a specific graphical representation of a dataset (e.g., dataset 512). The user interface 510 includes operations 514 which are available for datasets, sch as operations to join datasets together. For example, left join, right join, inner join, outer join, and so on, may be performed on two or more datasets. Additionally, mapping information 516 between datasets may be used to perform these joins (e.g., 'account_number' may be used for a join, such as to link datasets together).

Figure 5C:
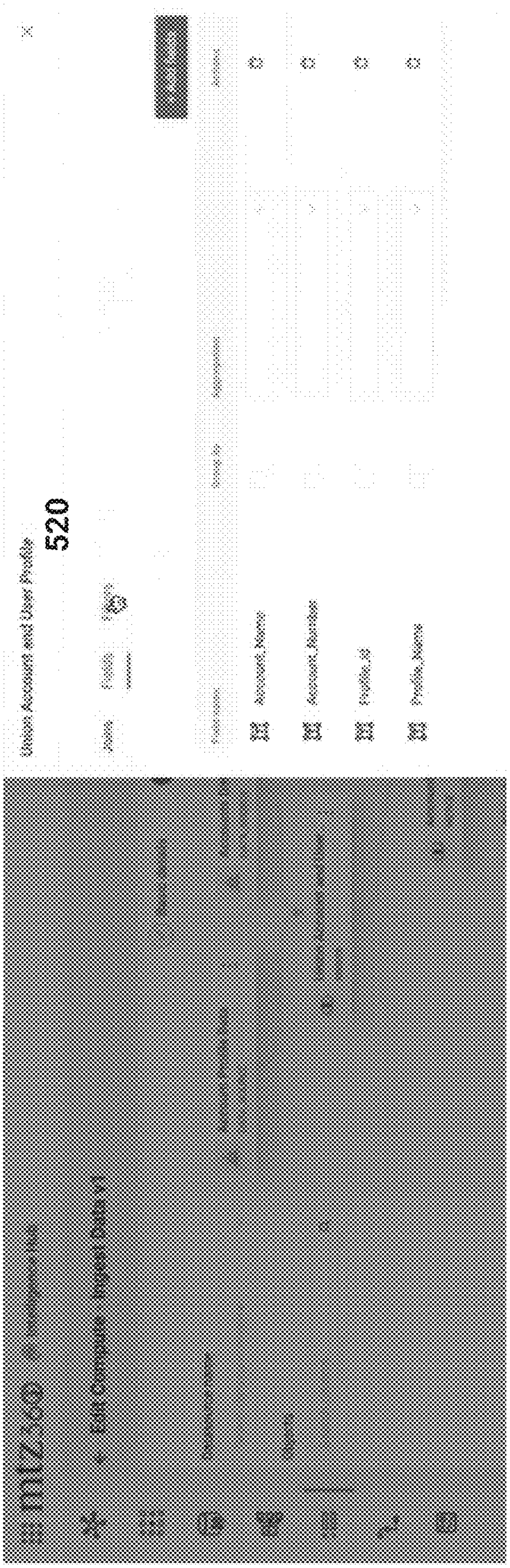

FIG. 5C illustrates user interface 520 which includes fields associated with a dataset. These fields may be automatically identified based on analyzing a dataset. For example, the user may indicate a network location associated with a dataset (e.g., an S3 bucket, and so on). The system may then analyze the dataset to determine relevant fields. These fields, such as 'Account_name,' may then be included for presentation in user interface 520. In this way, the user may quickly analyze the fields which will form a basis for determining fee information. The user may delete fields, or manually add fields, using user interface 520.

Figure 5D:
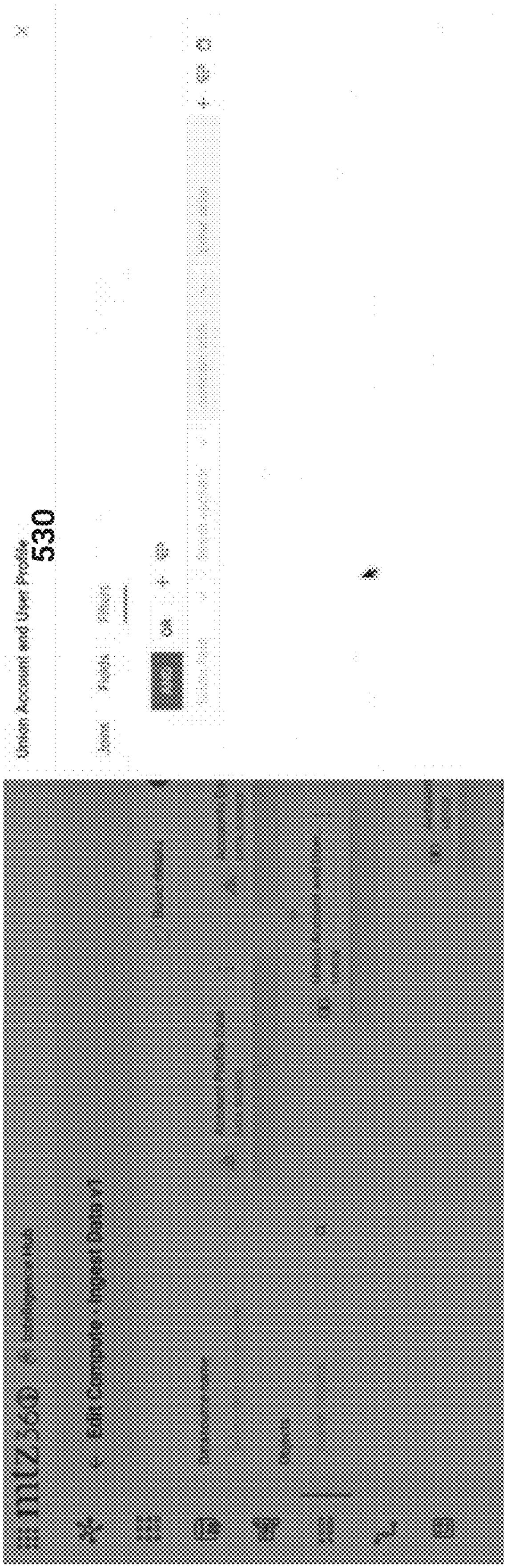

FIG. 5D illustrates user interface 530 which includes filter options associated with a dataset. Example filters may be applied to specific fields optionally along with operators.

Figure 5E:
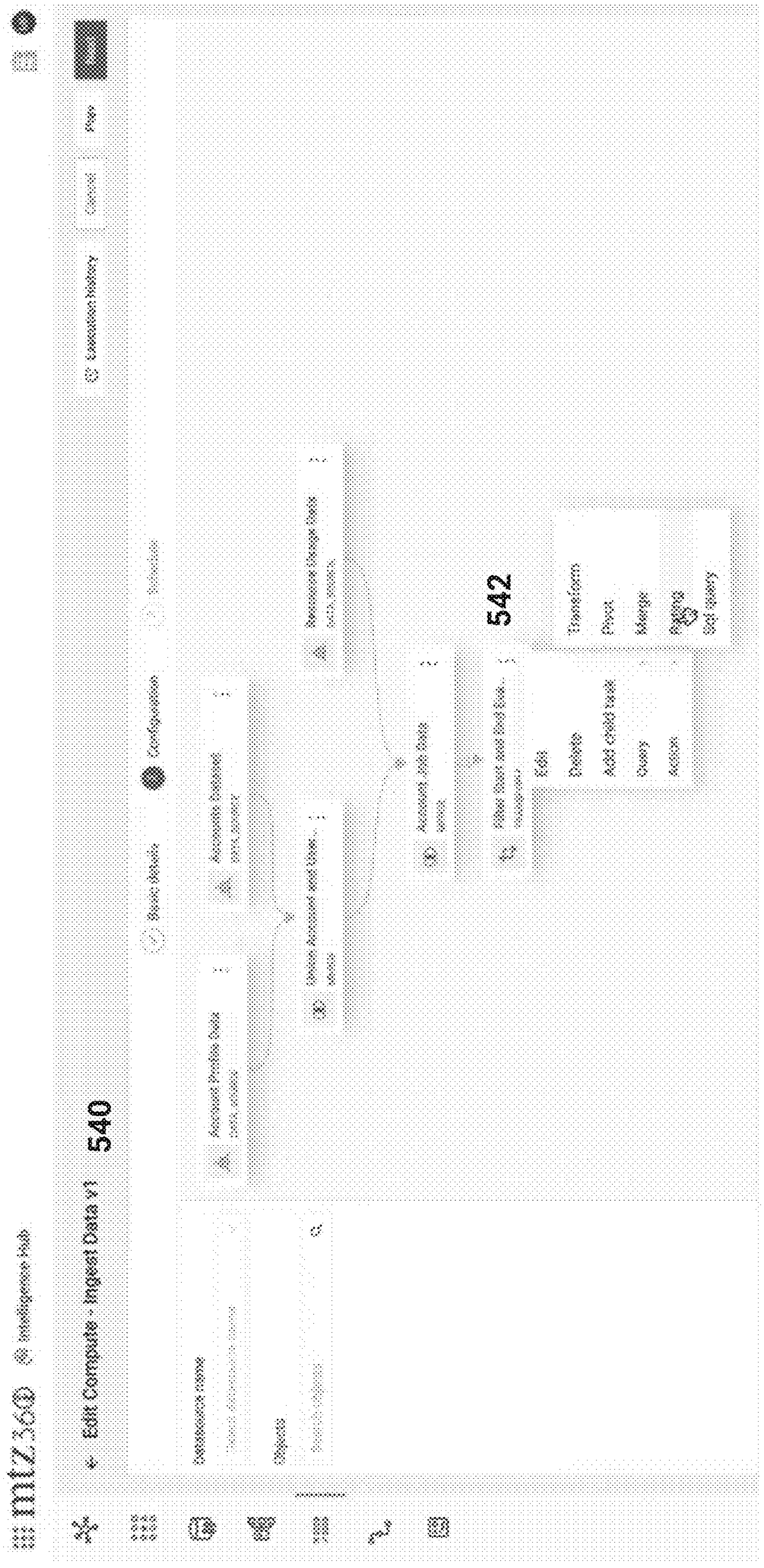

FIG. 5E illustrates user interface 540 which depicts the overall chain of operations associated with processing interaction data. The user of user interface 540 has selected a graphical representation 542, for example via touch-based input or a mouse click, and the user interface 540 has updated to present options. These options may be used by the user to quickly select operations which are to be applied to the dataset.

Thus, FIGS. 5A-5E describe techniques by which a user may provide user input to graphical user interfaces to ingest interaction data. These techniques allow for receiving entities to be set up with the system, such that fee calculations are automatically generated based on the actual, validated, interaction data associated with the receiving entities.

Figure 6A:
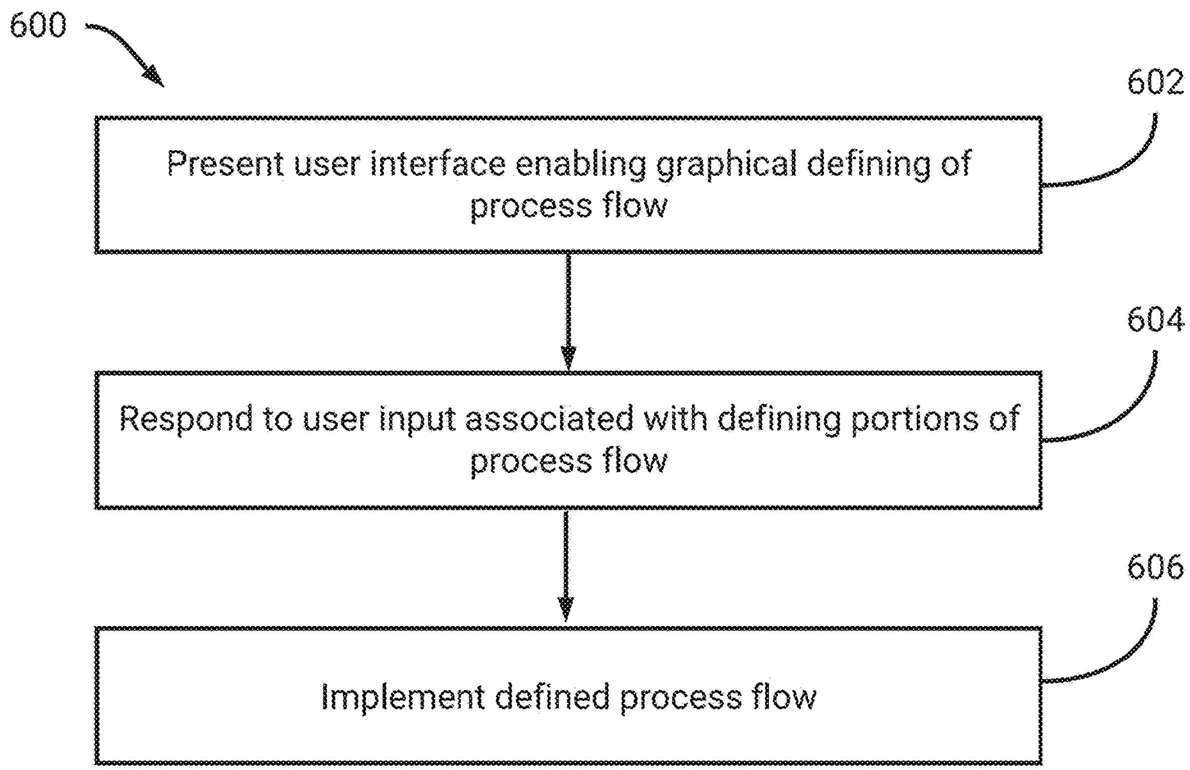
FIG. 6A is a flowchart of an example process for implementing a graphically defined process flow.

FIG. 6A is a flowchart of an example process 600 for implementing a graphically defined process flow. For convenience, the process 600 will be described as being performed by a system of one or more computers (e.g., the service customization system 100).

At block 602, the system presents a user interface which enables defining of a process flow. In some embodiments, the techniques described herein may be based on process flows which are the system executes. For example, the system may access a process flow associated with defining a service. In this example, the process flow may include a portion which includes defining parameters. The process flow may also include a portion which includes defining fee calculation techniques. The process flow may also include a portion which includes an approval step.

In some embodiments, the process flows may be graphically defined using a graphically-driven programming language. Advantageously, the graphically-driven programming language may require no-code and instead utilize drag-and-drop functionality. For example, functions or operations may be dragged onto a user interface and used to define arbitrary process flows. These functions or operations may be embodied in nodes, such as graphical nodes, which are able to be dropped into the user interface.

At block 604, the system responds to user input associated with a process flow. As described above, a user may use the user interface to define different process flows for implementation by the system. Additionally, the techniques described in the processes above (e.g., process 200, 300, and 400) may be defined as process flows.

At block 606, the system implements the defined process flow. The system implements the process flow by traversing between nodes. Examples of such traversing are described below.

Figure 6B:
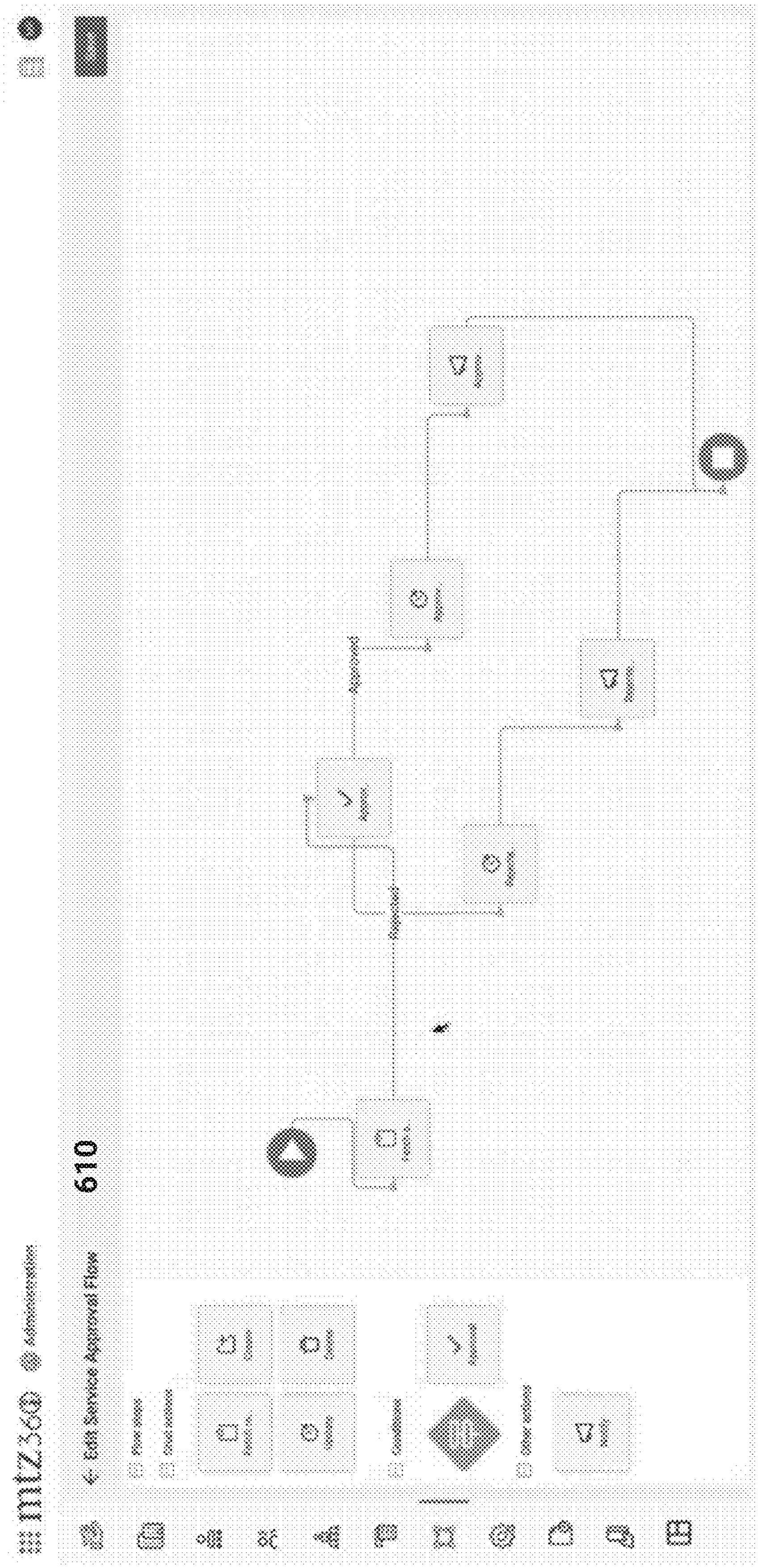
FIG. 6B-6C are example user interfaces depicting graphical representations associated with implementation of a process flow.
Figure 6C:
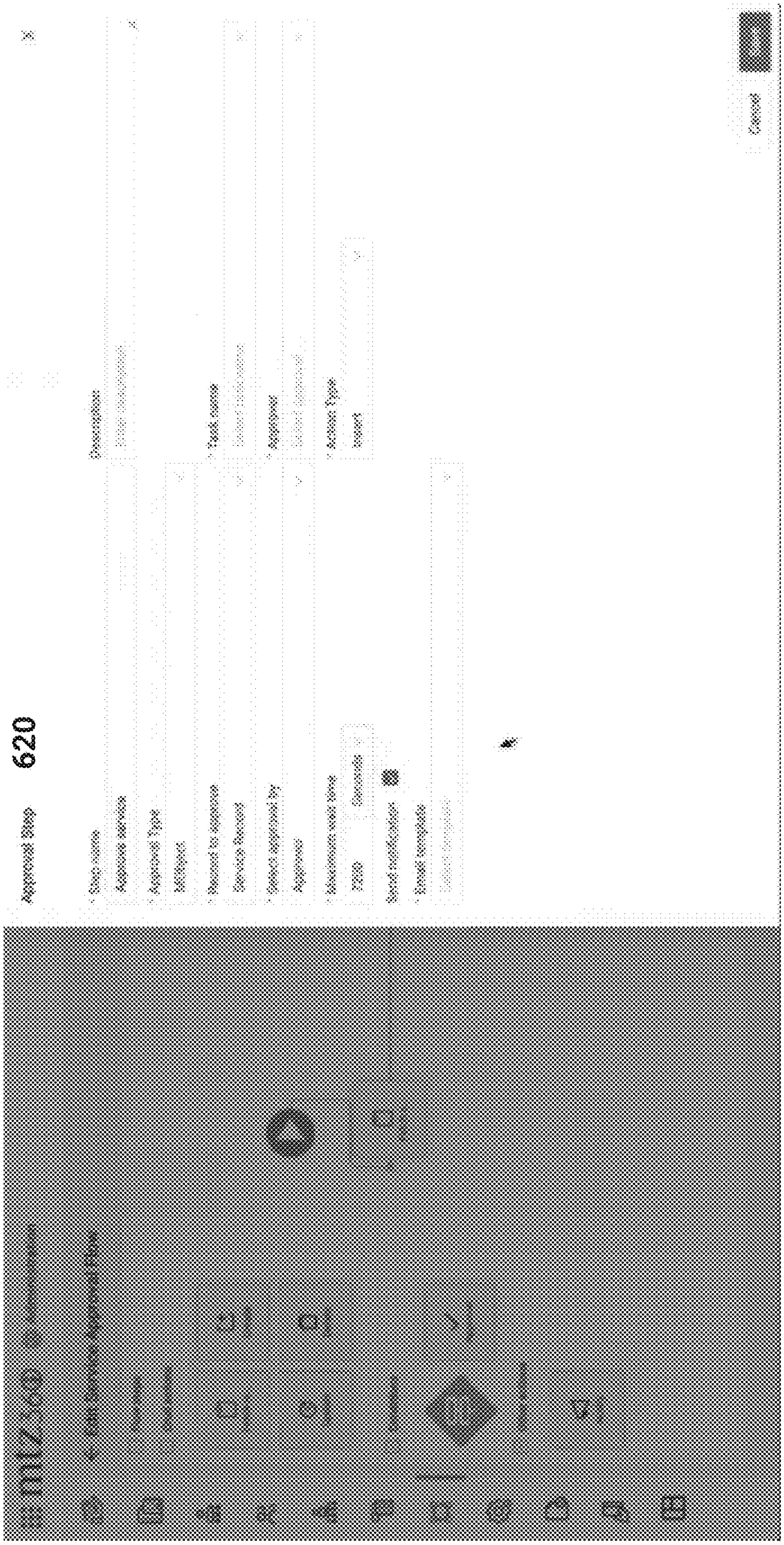

FIG. 6B-6C are example user interfaces depicting graphical representations associated with implementation of a process flow. FIG. 6B illustrates a user interface 610 that includes example nodes associated with a process flow. As illustrated, these nodes may be connected to form an overall process which is implemented by the system. FIG. 6C illustrates a user interface 620 that includes an approval step. The approval step may represent one of the nodes included in user interface 610. As illustrated, the approval step may be dragged onto user interface 610. Detailed information may then be presented in user interface 620. For example, the detailed information may be used by the system to effectuate approval.

Figure 7A:
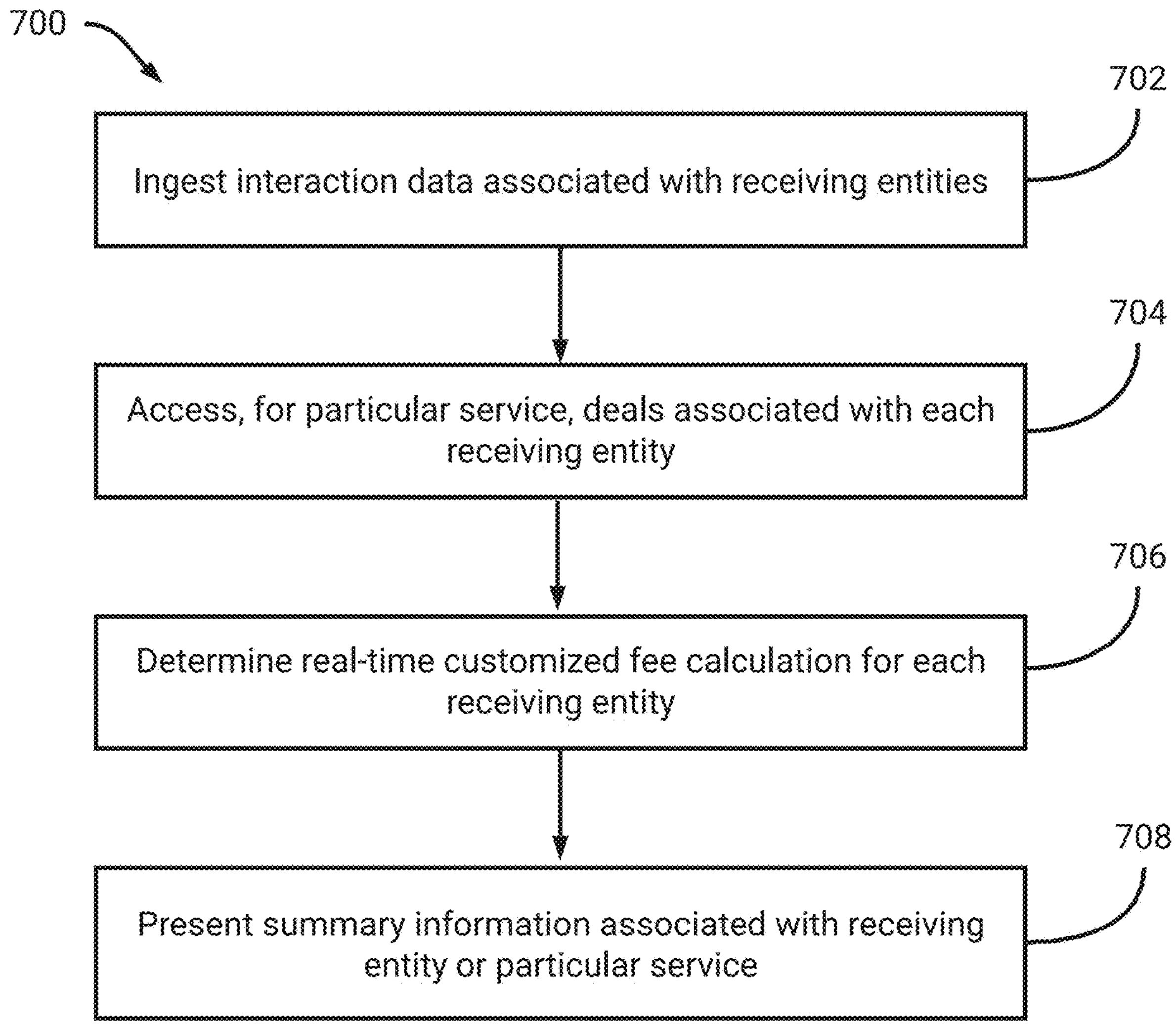
FIG. 7A is a flowchart of an example process for presenting summary information associated with a particular service.

FIG. 7A is a flowchart of an example process 700 for presenting summary information associated with a particular service. For convenience, the process 700 will be described as being performed by a system of one or more computers (e.g., the service customization system 100).

At block 702, the system ingests interaction data. As described above, a receiving entity may agree to a deal such that they may use a service. Interaction data may then be received which is indicative of use of the service.

At block 704, the system accesses deals associated with each receiving entity. At block 706, the system determines fee calculations for the receiving entities. As described above, receiving entities may have customized fee calculations for the same service. Thus, the system accesses deals for each receiving entity and applies the interaction data to the associated fee calculation.

At block 708, the system presents summary information. As described above, summary information may include fee information associated with use of the service.

Figure 7B:
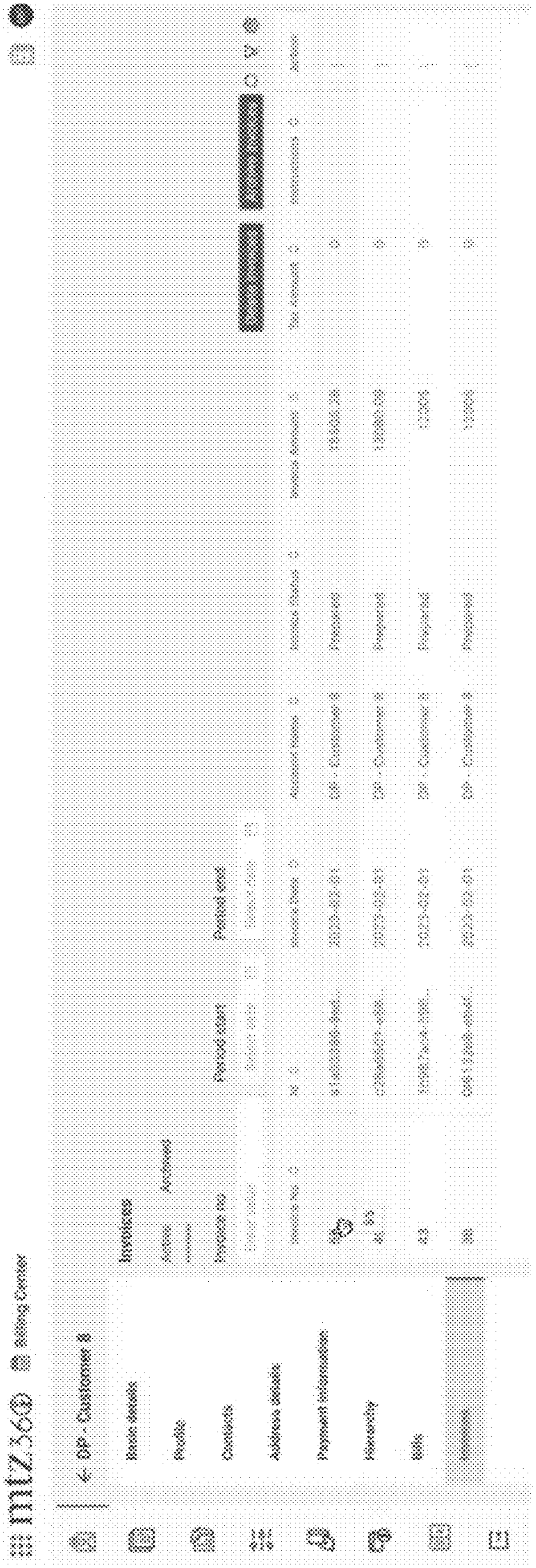
FIGS. 7B-7C are example user interfaces associated with presenting summary information.
Figure 7C:
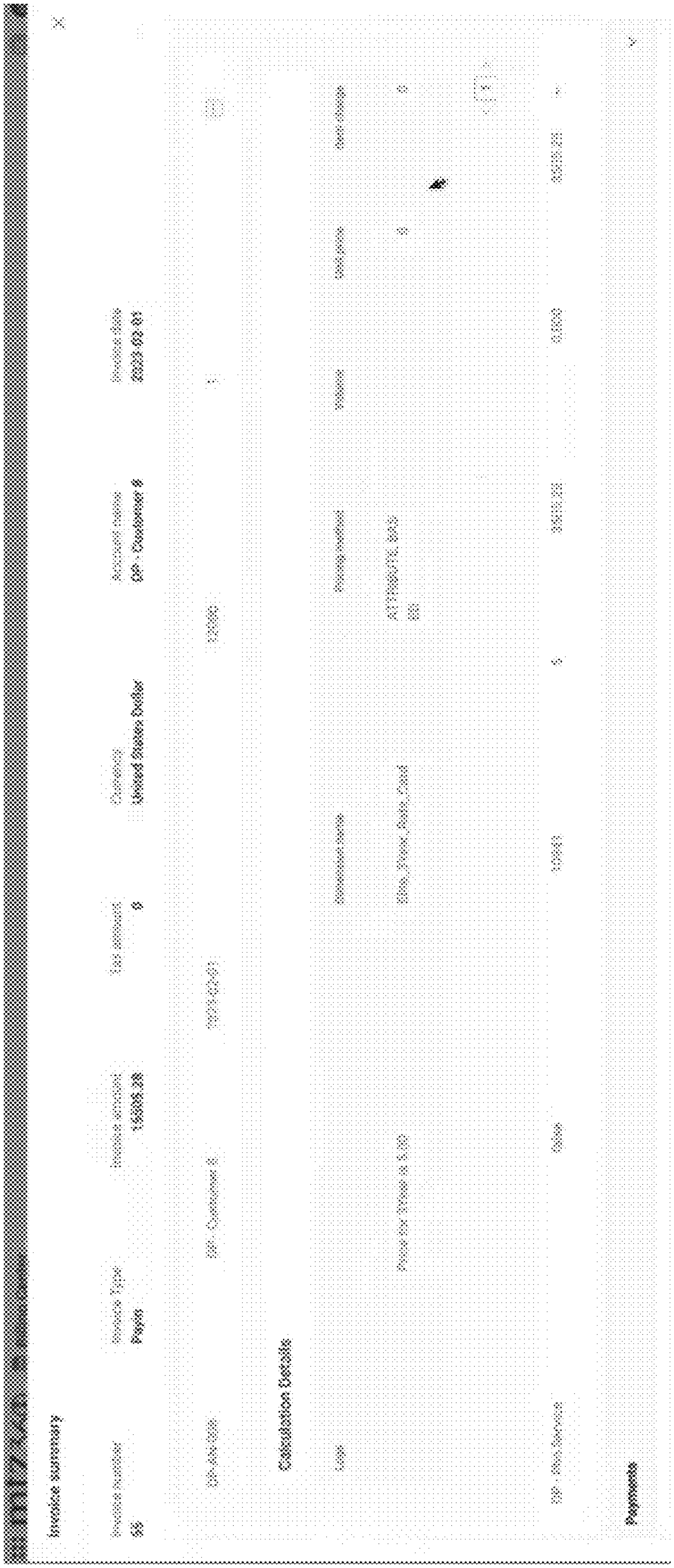

FIGS. 7B-7C are example user interfaces associated with presenting summary information. These user interfaces illustrate example of invoices which may be automatically generated based on interaction data. Additionally, FIG. 7C illustrates example calculation details associated with an invoice.

Figure 8:
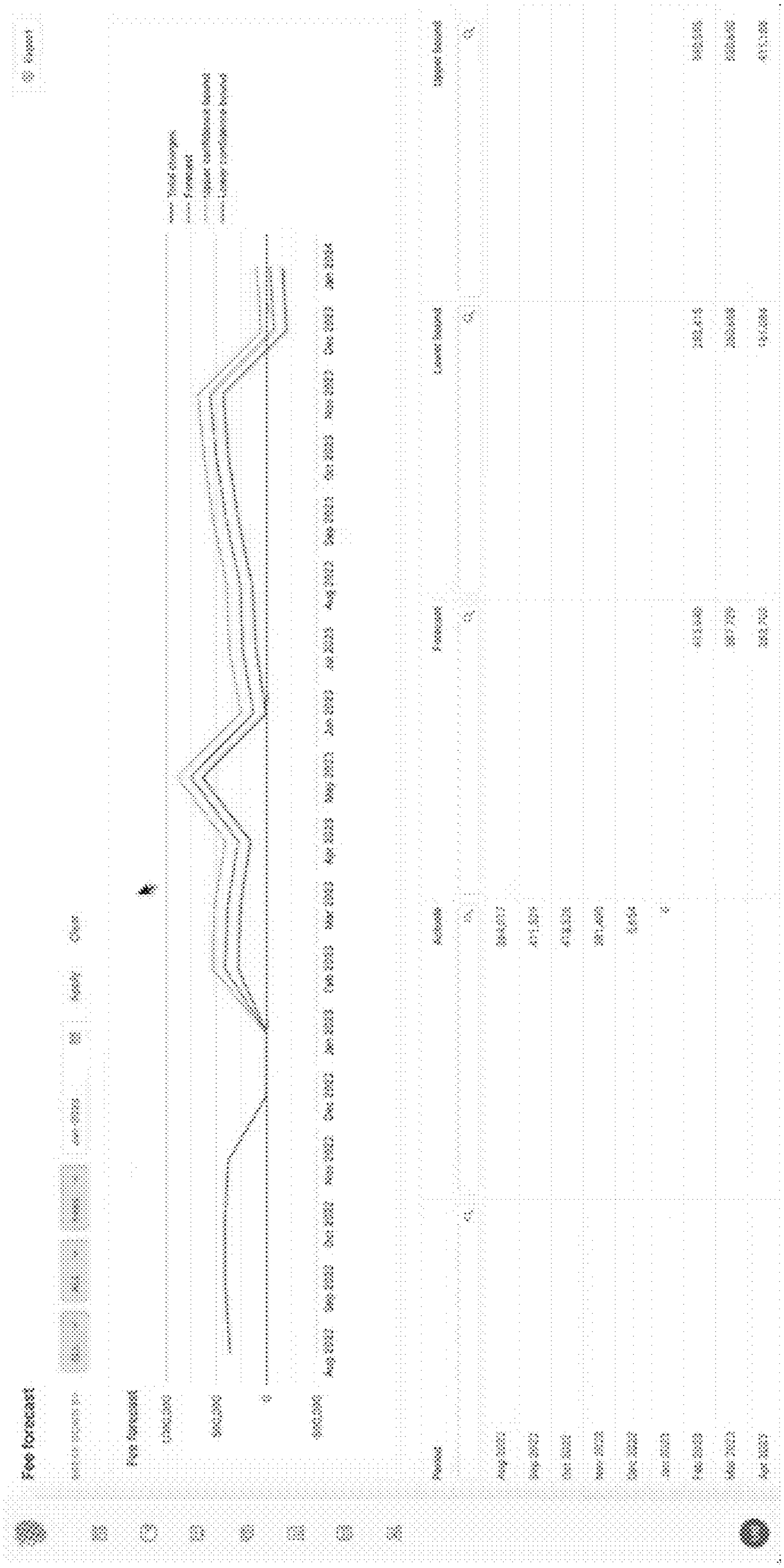
FIG. 8 is an example user interface that includes forecast information associated with a service.

FIG. 8 is an example user interface that includes forecast information associated with a service. As described above, estimates of future fees may be effectuated by the system. FIG. 8 illustrates an example graphical representation of such a forecast, for example using a chart.

Automation Using Internal and External Models

The disclosed technology further describes a web application which enables an end-user to view the pricing of a service based on usage data. As will be described, usage data may be simulated and/or historical data associated with an end-user's use of one or more services offered by an entity. For example, an end-user may use a user interface to provide usage data and rapidly view the pricing of a service based on the entered usage data.

Advantageously, the disclosed technology may receive the usage data and automatically determine all, or a portion of, the service information needed for setting up a service, such as the dimensions, the techniques by which a fee is to be calculated, and/or the other parameters for determining pricing for a service. The disclosed technology may automatically configure a service from the service information. As such, the disclosed technology reduces the complexity of the user input needed by a web application to set up a service. For example, the system may determine and automatically configure the dimension, techniques, and other parameters to determine the pricing of a service from usage data without the need for intervening user input.

The disclosed technology may include machine learning models and/or deep learning models (generally referred to herein as "models"), such as language models ("LMs"), large language models ("LLMs)" and/or other models. The models may be used to determine the parameters for setting up a service and/or automatically configure a service from parameters. The models may include internal models and external models. As will be described, internal models are models internal to the web application. The internal models may be accessible by the web application and trained to perform specialized tasks in the web application. As will be described, the external models are models external to the web application. The external models may be publicly available models that are trained using large datasets to perform a large set of tasks.

As will be described in at least FIG. 10A, the internal models may process usage data and determine generalized profile data. As will be described, the generalized profile data can be a prompt for use in the external models. For example, the internal models may process usage data and determine a language prompt describing the usage data, with any confidential information removed. The generalized profile data may be used by the external models to determine specified profile data. As will be described, specified profile data can be the output from the external models based on the generalized profile data. For example, an LLM external model can use a generalized profile data in the form of a language prompt, to determine a language answer describing pricing details. The specified profile data may be used by the internal models to determine service information and automatically configure a service. For example, the internal models may receive a language answer describing pricing details and automatically determine and configure the dimensions, techniques, and/or other parameters for a service. The service details may be compiled in display data and sent to a user interface to be displayed to an end-user.

Advantageously, the use of internal models and external models may allow the web application to take private information in the usage data and remove and/or obscure the private information in the generalized profile data. The web application may then leverage the large training base of the external models to provide improved precision for the determined pricing of a service.

The disclosed technology may utilize information, such as usage data, generalized profile data, specialized profile data, display data, and/or other information to train and/or retrain models. For example, the information may be used to train and/or retrain an internal model or an external model.

Block Diagrams

Figure 9:
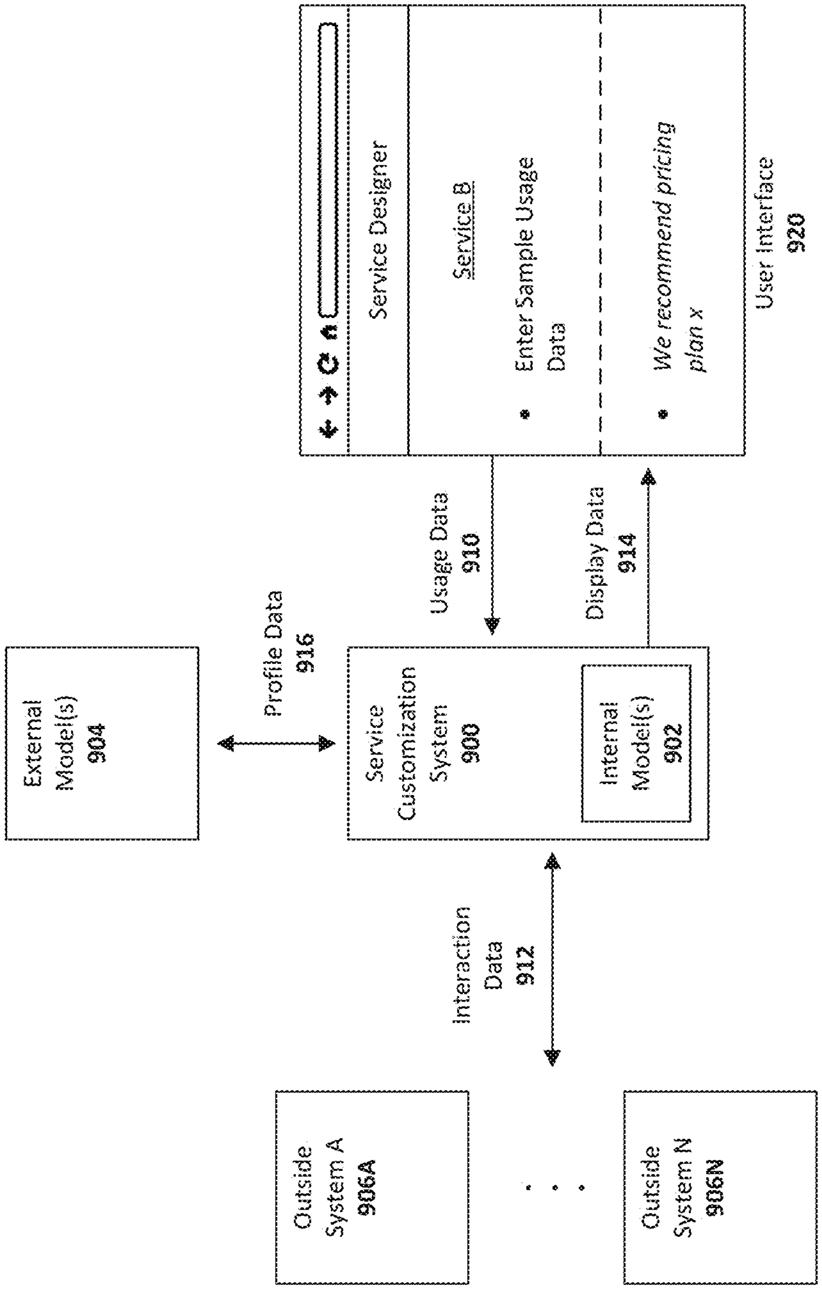
FIG. 9 illustrates a block diagram of an example service customization system responding to user input via an example user interface using one or more internal models.

FIG. 9 illustrates a block diagram of an example service customization system 900 responding to user input via an example user interface 920. The example service customization system 900 described in FIG. 9 can include all or a portion of the service customization system described in FIG. 1. As will be described, the service customization system 900 may receive user input associated with sample usage data associated with one or more services offered by an entity. For example, user interface 920 includes options associated with inputting sample usage data associated with "Service B." Once entered the sample usage data 910, alone with profile data 912 that is shared with the external models 904, can be utilized to determine fees associated with Service B.

In FIG. 9, user interface 920 may be presented via a user devise of a user. Example user devices may include a laptop, a computer, a tablet, a wearable device, and so on. The user interface 920 may therefore be rendered, at least in part, via the user device. Information included therein may be provided via the service customization system 900. For example, the user interface 920 may be associated with a front-end of a web application which is used by the user.

The service customization system 900 may include all, or a portion of the functionality of service customization system 100. The service customization system 900 may represent a system of one or more computers, one or more virtual machines executing on a system of one or more computers, one or more services or applications executing on a system, and so on. The service customization system 900 may therefore execute, and enable access to, the above-described web application. For example, users associated with an entity may be associated with log-in information. In this example, individual users may leverage the user interface 920 to define services as described herein.

The outside systems 906A-906N may include all, or a portion of the functionality of outside systems 110A-110N. The outside systems 906A-906N (e.g., outside system A) may represent systems which provide interaction data 912 associated with Service B. As described herein, interaction data 912 may represent any information which is usable to determine fees associated with Service B. For example, as may be appreciated a particular service may be associated with fees according to an amount of time of the particular service was used. In this example, software may be run on end-user devices of a receiving entity. As the software is used, a tool, agent, or software, may monitor the amount of time. For example, outside system 906A may be associated with the receiving entity and may aggregate this time information for the end-users. The time information may be provided by outside system 906A to the service customization system 900 as interaction data 912. As will be described, the interaction data 912 may be used by the system 100 to accurately, and automatically, determine fees associated with Service B.

The above-described example of interaction data 912 related to amounts of time individual end-users used Service B. As will be described, any dimension may be used to inform fee determinations of a receiving entity. For example, time may represent a dimension. As another example, a dimension may relate to a number of licenses to software which are used by end-users. As another example, a dimension may relate to a number of a physical product used by end-users.

As will be described, the interaction data 912 may be ingested by the service customization system 900. User interfaces, such as user interface 920, enable a user of the service customization system 900 to provide usage data 910 that is processed by the service customization system 900 along with the interaction data 912. Additionally, the interaction data 912 may be transformed, or otherwise adjusted or analyzed. For example, the interaction data 912 may be analyzed to map the information to dimensions which are usable to determine fees associated with Service B based on profile data 916.

The one or more external model(s) 904 may represent models outside of the service customization system 900 that can use and provide profile data 916 associated with Service B. Example of external models include large language models, such as GPT-based models, BARD, and so on. As known b those skilled in the art, a large language model may represent a transformer-based neural network optionally with a mixture of experts architecture that is trained based on a substantially large corpus of text. The external models may be responsive to endpoint or application programming interface (API) calls.

As described herein, profile data 916 may represent information processed by one or more models which is usable to determine fees associated with Service B. For example, profile data 916 can include generalized profile data output from the one or more internal model(s) 902 and specified profile data output from the external models 904. As will be described, when the internal models 902 and external models 904 include LLMs, the profile data 916 may include language data describing aspects of Service B.

In user interface 920, an end-user is defining Service B. The illustrated example includes an option to "Enter Sample Usage Data," which, as described above, may represent the end user inputting usage data 910, such as simulated and/or historical data associated with an end-user's use of one or more services offered by an entity. Example usage data 910 may include a sample of historical usage of the end-user for Service B or a similar service. If the end user does not have historical data associated with the use of Service B, the usage data 910 may be simulated. For example, the user interface 920 may prompt the end-user with questions regarding predicted use. In this example, the usage data 910 may include the end-user's language response to these prompts.

To input usage data 910, user input may be used. Example user input may include interactions with the user interface 920. For example, the user input may include keyboard/mouse input. As another example, the user input may include touch-based input. In some embodiments, the end-user may provide verbal or textual input associated with actions to be taken by the system 900. For example, an LLM of the internal models 902, may respond to the user input and effectuate actions such as generating prompts and generating usage data 910 from the prompts.

The usage data 910 may be used as input to the service customization system 900 to determine fees for Service B. The usage data 910 may be used by the internal models 902 along with interaction data 912 to determine a portion of the profile data 916. For example, based on the usage data the internal models 902 may determine interaction data 912 is needed to provide the profile data 916 to the external models 904. In this example, the internal models 902 compile the usage data 910 and interaction data 912 into profile data 916 for use by the external models 904. As will be described, the external models 904 can use and provide profile data 916 associated with a fees for Service B based on the usage data 910. As will be described, the internal models 902 can use profile data 916 provided by the external models 904 and automatically configure Service B. For example, the internal models 902 may configure the dimensions of Service B automatically based on the output of the external models 902.

The internal models 902 may compile the dimensions of Service B into display data 914. The display data 914 may be any data necessary for presenting Service B to the end-user. In the illustrated example, display data 914, causes user interface 920 to display the message, "We recommend pricing plan x," to an end user. It can be appreciated that "pricing plan x" as illustrated may represent the presentation of any of the pricing elements to the user such as the interaction summaries as described above. The display data 914 may include multiple options for Service B and may include the option to customize Service B using any of the techniques previously described.

In contrast to prior technological schemes and tools, the disclosed technology allows for seamless presentation of pricing options. Further, the disclosed technology allows for seamless customization of Service B for receiving entities. As previously described, fee calculations such as fee reducing, or other parameters may be customized for a particular entity. The disclosed technology allows for the usage data 910 to include these customization or for customizations to be presented as options to the receiving entity in the display data based on the usage data 910. For example, the usage data 910 may include that the receiving entity's usage of Service B is projected to pass a discount threshold. In this example, the display data 914 may include information regarding discounts, options of discounts, pricing tradeoffs for different options for the receiving entity, and other customizations based on the usage data 910.

Advantageously, such customizations may be effectuated in substantially real-time. For example, the customizations may be associated with Service B such that different SKUs are not needed. Instead, the service customization system 900 may divorce such customizations from the underlying service associated with Service B. In this way, the system 900 may automatically determine fees for individual receiving entities according to different techniques.

Figure 10A:
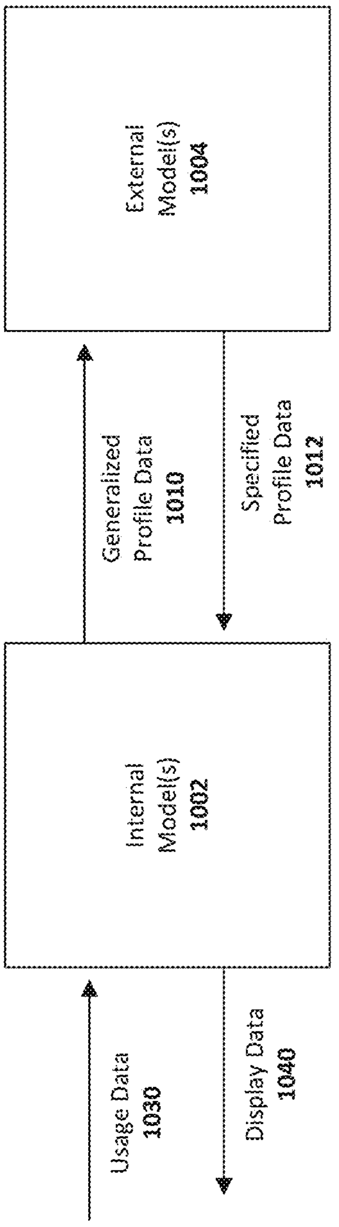
FIG. 10A-10B illustrate block diagrams of example flow paths of processing usage data.
Figure 10B:
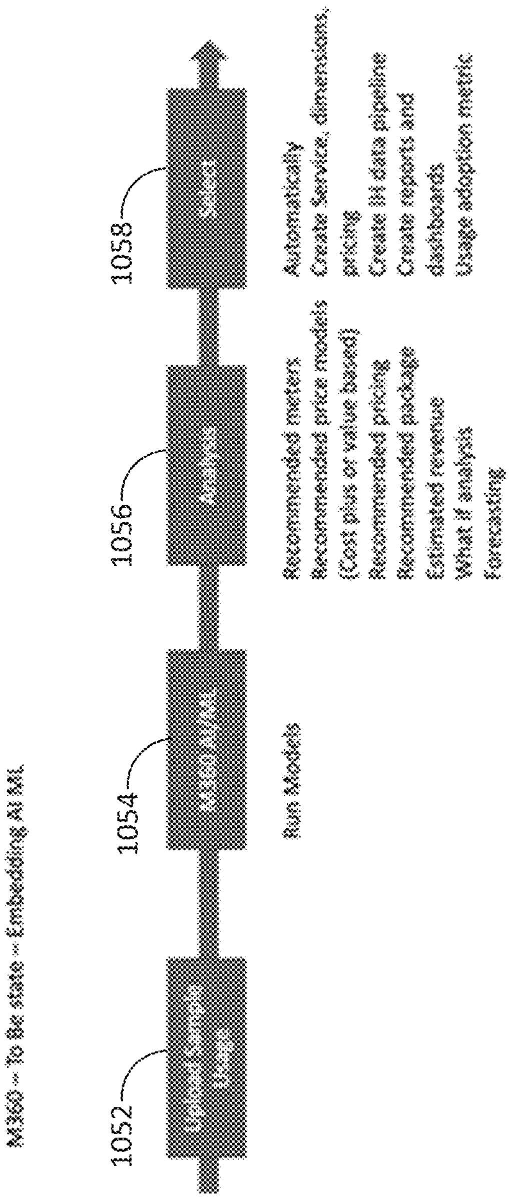

FIGS. 10A-10B illustrate block diagrams of example flow paths of processing usage data. FIG. 10A illustrates a block diagram showing an example of processing usage data 1030 using one or more internal model(s) 1002 (e.g., internal machine learning models) and one or more external model (s) 1004 (e.g., external machine learning models). An external model may represent, for example, a model which is executed and run on an external system (e.g., one not under control of an entity that controls the internal model, but one to which the entity can provide information).

FIG. 10A may be performed, in part, by a service customization system, such as service customization system 900. Further, usage data 1030 may include all, or a portion, of the components of usage data 910, internal models 1002 may include all, or a portion, of the components of internal models 902, external models 1004 may include all, or a portion, of the components of external models 904, the generalized profile data 1010 and the specified profile data 1012 may include all, or a portion, of the components of profile data 916, and the display data 1040 may include all, or a portion, of the components of display data 914.

In FIG. 10A, usage data 1030 is input into the internal models 1002. As previously described, the usage data 1030 may include simulated and/or historical data associated with an end-user's use of service offered by an entity and/or language responses to a prompt. As can be appreciated, the usage data 1030 may not be in an optimal format for use as an input for certain models, such as LLMs, that may be used as one of the external models 1004. Further, the usage data 1030 may not include all the necessary information for the external models 1004 to provide optimized information for service fees. Further still, the usage data 1030 may contain private and/or otherwise confidential information that an end-user does not wish to bed disclosed to a publicly available model, such as one of the external models 1004.

Advantageously, the internal models 1002 may receive and process the usage data 1030 to transform the usage data into a format optimized for use with the external models, add necessary information (e.g., from interaction data), and/or remove confidential information and then output data as generalized profile data 1010. For example, the usage data 1030 may contain only sample data associated with an end-user's user of Service B (e.g., columns of numerical data). In this example, the internal models 1002 may add interaction data to the usage data 1030 and configure the output into an optimized format for the external model, such as transforming the usage data 1030 into a word prompt for use with an LLM. In another example, the usage data 1030 may contain only language responses to a prompt. In this example, the internal models 1002 may use the language responses of the usage data 1030 and input from outside systems, such as outside systems 906A-906N, to generate an output that is optimized for the external models.

As described above, generalized profile data 1010 is the output of the internal models 1002. The generalized profile data 1010 is configured to be used with the external models 1004. For instance, the external models 1004 may contain LLMs. In these instances, the generalized profile data 1010 may be formatted as a language prompt for an LLM. For example, the generalized profile data 1010 may be a language prompt that includes narrative descriptions of usage data 1030 and questions regarding pricing information based on the narrative description.

The external models 1004 may use the generalized profile data 1010 as a prompt to determine specified profile data 1012. As previously described, the external models 1004 may include publicly available models trained using large datasets. Advantageously, the generalized profile data 1010 contains information specific to the usage data 1030, with any confidential information removed. Therefore, the large training sets used to train the external models 1004 may be leveraged without sharing confidential information with the external models 1004.

The specified profile data 1012 may be specific information regarding the pricing of a service based on the usage data 1030. The specified profile data 1012 may require further processing. For example, the specified profile data 1012 may be a language response provided by an LLM based on the generalized profile data 1010. Further, the specified profile data 1012 may include information that may need to be removed. The specified profile data 1012 may include irrelevant information or incorrect information. For example, the specified profile data 1012 may include information regarding services not offered by the service customization system or incorrect information regarding services or pricing.

The specified profile data 1012 may be input back into the internal models 1002 for further processing. For example, the internal models 1002 may remove incorrect or irrelevant information from the specified profile data 1012. In some embodiments, the internal models 1002 may decide that the specified profile data 1012 is incomplete or otherwise inadequate. The internal models 1002 may use the specified profile data 1012 to create an altered generalized profile data 1010 to be input back into the external models 1004.

As previously described, the internal models 1002 may process the specified profile data 1012 to automatically configure the dimensions, techniques, and/or other parameters for a service. The internal models 1002 may determine one or more outside systems and/or interaction data to be used in a service. The internal models 1002 may compile the information into display data 1040. As previously described the display data 1040 may include any data necessary for presenting details of the configured service to an end user. The display data 1040 may include a recommended pricing plan for a service, options of pricing plans for a service, customization options for a service, and/or other information regarding the service determined by the internal models 1002 and/or external models 1004.

FIG. 10B illustrates a block diagram showing an example of a service customization system, such as service customization system 900, processing usage data. At process 1052, an end user uploads sample usage data into the service customization system. For example, a user may upload usage data 910, using the techniques previously described.

At process 1054, the service customization system runs one or more models to process the sample usage data. For example, the service customization system may run internal models, such as internal models 902, and external models, such as external models 904, to process the sample usage data.

At process 1056, the models can provide the service customization system with recommendations for a service based on the sample usage data. For example, the models may recommend meters, type of price models, service pricing, service packaging, estimated revenues, what if analysis, forecasting, etc. for a service.

At process 1058, the service customization system can use the recommendations to automatically create and/or configure a service. For example, the service customization system may automatically configure the dimensions, pricings, process flows, reports, dashboards, metrics, etc. for a service.

Example Flowcharts

Figure 11:
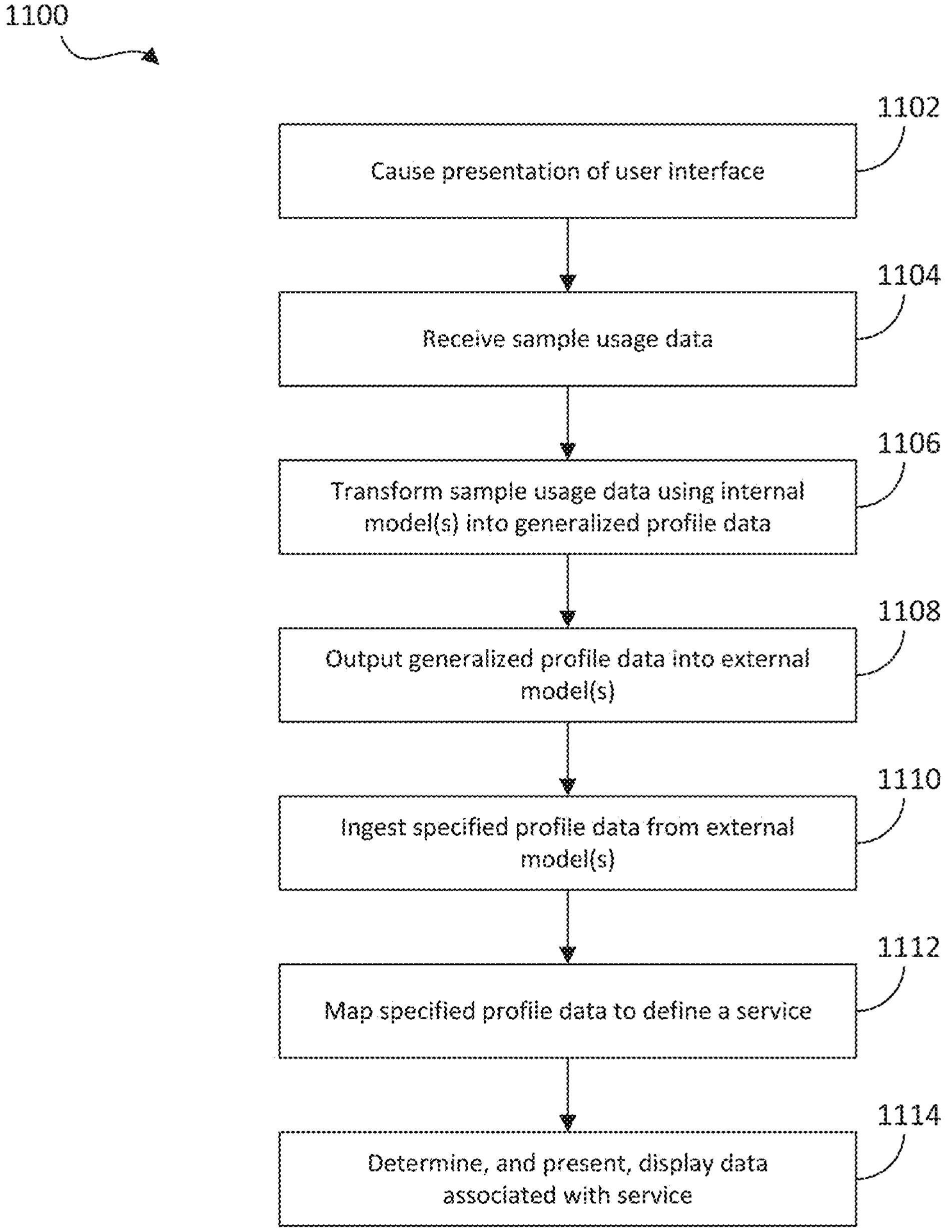
FIG. 11 is a flowchart of an example process for determining information associated with a service using internal and external models.

FIG. 11 is a flowchart of an example process 1100 for determining information associated with a service. For convenience, the process 1100 will be described as being performed by a system of one or more computers (e.g., the service customization system 900).

At block 1102, the system causes presentation of a user interface. As described in FIG. 9, the user interface may be presented via a user device of a user. In some embodiments, the user interface may be presented via an application (e.g., mobile application) or web application on the user device.

At block 1104, the system receives sample usage data from the user. The usage data can include any of the features described previously in FIGS. 9 and 10.

At block 1106, the system transforms the sample usage data using one or more internal model(s) into generalized profile data. For example, the system can utilize internal models, such as internal models 1002, to transform the sample usage data into generalized profile data. As previously described in, the generalized profile data may be a prompt for use in the external models based on the sample usage data.

At block 1108, the system outputs the generalized profile data into the external models. For example, the system can output the generalized profile data into the external models as described in FIGS. 9 and 10.

At block 1110, the system can ingest specified profile data from the external models. For example, the system can receive the specified profile data from the external models as described in FIGS. 9 and 10.

At block 1112, the system can map the specified profile data to define a service. For example, the system can utilize internal models, such as internal models 1002, to create and/or configure a service based on the specified profile data, as is described in FIGS. 9 and 10.

At block 1114, the system determines and presents summary information associated with the service based on the defined service, such as display data 1040. As the service is utilized by receiving entities, a user of the system may view summary information associated with the use. For example, summary information may include graphical representations of fees which may be filtered according to receiving entity, time, and so on. The system may also present summary information reflecting use information for all, or specific, receiving entities.

OTHER EMBODIMENTS

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and engines described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method implemented by a system of one or more computers, the method comprising:

causing presentation of an interactive user interface;

receiving, via the interactive user interface, information defining an electronic service to be offered to receiving entities via deals, wherein the information includes an indication of a plurality of dimensions to be extracted from real-time interaction data, the real-time interaction data being derived based on, at least, interactions with a plurality of disparate outside systems associated with the electronic service, the interactions including, at least, usage information and the real-time interaction data reflecting machine data generated via the disparate systems;

determining information defining a customization associated with a particular deal of the deals, wherein the customization is associated with a particular receiving entity of the receiving entities and enables adjustments to the information defining the electronic service based on real-time information associated with the particular receiving entity, and wherein a same SKU is utilized for the customizations associated with the deals and information defining the electronic service is processed based on the customization;

integrating the real-time interaction data from the plurality of outside systems via one or more application programming interfaces (APIs) or pushed data streams, wherein the interactive user interface;

receives user input indicative of transformations and logic associated with analyzing the real-time interaction data, the user input reflecting interaction with a no-code, drag-and-drop user interface elements that form transformations and/or logic and access techniques to extract the machine data, and triggers continuous monitoring and analysis of the integrated real-time interaction data in accordance with the no-code, drag-and-drop user interface elements;

wherein the integrated real-time interaction data is utilized for fee calculations.

2. The method of claim 1, wherein the customization enables adjustment to a fee calculation defined in the electronic service.

3. The method of claim 2, wherein the adjustment is with respect to one or more of a dimension, a type associated with the fee calculation, or one or more logical expressions which form the fee calculation.

4. The method of claim 1, wherein the plurality of dimensions includes one or more of priceable dimensions or transaction dimensions.

5. The method of claim 1, wherein the information defining the electronic service further includes one or more logical expressions which use at least one parameter and which form a fee calculation.

6. The method of claim 1, wherein the real-time interaction data is indicative of use of the electronic service by end-users associated with the plurality of outside systems.

7. The method of claim 1, wherein the interactive user interface is configured to present summary information associated with use of the electronic service by one or more of the receiving entities.

8. A system comprising one or more processors and computer storage media storing instructions that when executed by the one or more processors cause the one or more processors to perform operations comprising:

causing presentation of an interactive user interface;

receiving, via the interactive user interface, information defining an electronic service to be offered to receiving entities via deals, wherein the information includes an indication of a plurality of dimensions to be extracted from real-time interaction data, the real-time interaction data being derived based on, at least, interactions with a plurality of disparate outside systems associated with the electronic service, the interactions including, at least, usage information and the real-time interaction data reflecting machine data generated via the disparate systems;

determining information defining a customization associated with a particular deal of the deals, wherein the customization is associated with a particular receiving entity of the receiving entities and enables adjustments to the information defining the electronic service based on real-time information associated with the particular receiving entity, and wherein a same SKU is utilized for the customizations associated with the deals and information defining the electronic service is processed based on the customization;

integrating the real-time interaction data from the plurality of outside systems via one or more application programming interfaces (APIs) or pushed data streams, wherein the interactive user interface:

receives user input indicative of transformations and logic associated with analyzing the real-time interaction data, the user input reflecting interaction with a no-code, drag-and-drop user interface elements that form transformations and/or logic and access techniques to extract the machine data, and triggers continuous monitoring and analysis of the integrated real-time interaction data in accordance with the no-code, drag-and-drop user interface elements;

wherein the integrated real-time interaction data is utilized for fee calculations.

9. The system of claim 8, wherein the customization enables adjustment to a fee calculation defined in the electronic service.

10. The system of claim 9, wherein the adjustment is with respect to one or more of a dimension, a type associated with the fee calculation, or one or more logical expressions which form the fee calculation.

11. The system of claim 8, wherein the plurality of dimensions include one or more of priceable dimensions or transaction dimensions.

12. The system of claim 8, wherein the information defining the electronic service further includes one or more logical expressions which use at least one parameter and which form a fee calculation.

13. The system of claim 8, wherein the real-time interaction data is indicative of use of the electronic service by end-users associated with the plurality of outside systems.

14. The system of claim 8, wherein the interactive user interface is configured to present summary information associated with use of the electronic service by one or more of the receiving entities.

15. Non-transitory computer storage media storing instructions that when executed by a system of one or more processors, cause the one or more processors to perform operations comprising:

causing presentation of an interactive user interface;

receiving, via the interactive user interface, information defining an electronic service to be offered to receiving entities via deals, wherein the information includes an indication of a plurality of dimensions to be extracted from real-time interaction data, the real-time interaction data being derived based on, at least, interactions with a plurality of disparate outside systems associated with the electronic service, the interactions including, at least, usage information and the real-time interaction data reflecting machine data generated via the disparate systems;

determining information defining a customization associated with a particular deal of the deals, wherein the customization is associated with a particular receiving entity of the receiving entities and enables adjustments to the information defining the electronic service based on real-time information associated with the particular receiving entity, and wherein a same SKU is utilized for the customizations associated with the deals and information defining the electronic service is processed based on the customization;

integrating the real-time interaction data from the plurality of outside systems via one or more application programming interfaces (APIs) or pushed data streams, wherein the interactive user interface;

receives user input indicative of transformations and logic associated with analyzing the real-time interaction data, the user input reflecting interaction with a no-code, drag-and-drop user interface elements that form transformations and/or logic and access techniques to extract the machine data, and triggers continuous monitoring and analysis of the integrated real-time interaction data in accordance with the no-code, drag-and-drop user interface elements;

wherein the integrated real-time interaction data is utilized for fee calculations.

16. The computer storage media of claim 15, wherein the plurality of dimensions include one or more of priceable dimensions or transaction dimensions.

17. The computer storage media of claim 15, wherein the information defining the electronic service further includes one or more logical expressions which use at least one parameter and which form a fee calculation.

18. The computer storage media of claim 15, wherein the real-time interaction data is indicative of use of the electronic service by end-users associated with the plurality of outside systems.

19. The computer storage media of claim 15, wherein the customization enables adjustment to a fee calculation defined in the electronic service, and wherein the adjustment is with respect to one or more of a dimension, a type associated with the fee calculation, or one or more logical expressions which form the fee calculation.

20. The computer storage media of claim 15, wherein the interactive user interface is configured to present summary information associated with use of the electronic service by one or more of the receiving entities.

* * * * *